US010273085B2

(12) United States Patent
Battles et al.

(10) Patent No.: US 10,273,085 B2
(45) Date of Patent: Apr. 30, 2019

(54) ITEM TRANSFER USING STACKABLE STORAGE MODULES

(71) Applicant: Amazon Technologies, Inc., Seattle, WA (US)

(72) Inventors: Jon Stuart Battles, North Bend, WA (US); Timothy Alan Talda, Seattle, WA (US); Martin Peter Aalund, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/408,207

(22) Filed: Jan. 17, 2017

(65) Prior Publication Data
US 2018/0201445 A1   Jul. 19, 2018

(51) Int. Cl.
*B65G 1/127* (2006.01)
*B65G 1/12* (2006.01)
(Continued)

(52) U.S. Cl.
CPC .......... *B65G 1/127* (2013.01); *B65G 1/0492* (2013.01); *B65G 1/12* (2013.01); *B65G 1/133* (2013.01);
(Continued)

(58) Field of Classification Search
CPC .......... B65G 1/12; B65G 1/127; B65G 1/133
See application file for complete search history.

(56) References Cited

U.S. PATENT DOCUMENTS

| 1,905,924 A | 4/1933 | MacLauchlan |
| 3,184,030 A | 5/1965 | Herbert |

(Continued)

FOREIGN PATENT DOCUMENTS

| DE | 2013005 A1 | 9/1971 |
| DE | 2552914 A1 | 6/1976 |

(Continued)

OTHER PUBLICATIONS

International Patent Application No. PCT/US2018/013922; Int'l Search Report and the Written Opinion; dated Jun. 21, 2018; 16 pages.

(Continued)

*Primary Examiner* — Thomas Randazzo
(74) *Attorney, Agent, or Firm* — Baker & Hostetler LLP

(57) ABSTRACT

An example process may include receiving a request identifying an action with respect to an item and a modular storage system. The modular storage system may include a plurality of shipping containers accessible from an item transfer facility. The process may also include identifying a particular shipping container of the plurality of shipping containers to fulfill the request. The process may also include identifying, within the particular shipping container, a particular storage module to fulfill the request. The particular storage module may include a particular plurality of storage containers. The process may also include identifying, from among the particular plurality of storage containers, a particular storage container to fulfill the request. The process may also include causing movement of the particular plurality of storage containers to move the particular storage container to an access position.

22 Claims, 17 Drawing Sheets

(51) Int. Cl.

| | | |
|---|---|---|
| *B65G 1/137* | (2006.01) | |
| *B65G 1/04* | (2006.01) | |
| *B65G 61/00* | (2006.01) | |
| *B65G 63/00* | (2006.01) | |
| *G05D 1/02* | (2006.01) | |
| *B65G 1/133* | (2006.01) | |
| *G06Q 30/06* | (2012.01) | |
| *G06Q 50/28* | (2012.01) | |

(52) U.S. Cl.
CPC .......... *B65G 1/1373* (2013.01); *B65G 61/00* (2013.01); *B65G 63/002* (2013.01); *G05D 1/0287* (2013.01); *G05D 2201/0216* (2013.01); *G06Q 30/0635* (2013.01); *G06Q 50/28* (2013.01)

(56) References Cited

U.S. PATENT DOCUMENTS

| | | | |
|---|---|---|---|
| 3,809,208 A | 5/1974 | Shields | |
| 3,904,022 A | 9/1975 | Lutz | |
| 4,093,086 A * | 6/1978 | Lucas | B65G 1/0485 414/283 |
| 4,346,803 A | 8/1982 | Haessler et al. | |
| 4,372,723 A | 2/1983 | De Coene et al. | |
| 4,378,873 A | 4/1983 | Cloudy | |
| 4,465,417 A | 8/1984 | Baumann et al. | |
| 4,934,507 A | 6/1990 | Blocker | |
| 5,387,064 A | 2/1995 | Cardinal | |
| 5,465,827 A | 11/1995 | Nakagawa et al. | |
| 5,472,309 A * | 12/1995 | Bernard, II | B65G 1/0485 414/807 |
| 5,707,199 A | 1/1998 | Faller | |
| 6,098,786 A | 8/2000 | Brumm et al. | |
| 6,336,549 B1 | 1/2002 | Jen | |
| 6,626,282 B1 | 9/2003 | Nishizawa et al. | |
| 6,752,583 B2 | 6/2004 | Rajewski | |
| 6,784,391 B2 | 8/2004 | Takizawa | |
| 6,814,214 B2 | 11/2004 | Warlow et al. | |
| 6,814,221 B2 | 11/2004 | Goussev | |
| 7,090,068 B2 | 8/2006 | Matsuo | |
| 7,381,022 B1 | 6/2008 | King | |
| 7,637,367 B1 | 12/2009 | Cannell | |
| 7,798,305 B2 | 9/2010 | Camelli | |
| 8,308,418 B2 | 11/2012 | Ma et al. | |
| 8,939,296 B2 | 1/2015 | Weyler et al. | |
| 8,972,045 B1 * | 3/2015 | Mountz | G06Q 10/087 700/216 |
| 9,028,613 B2 | 5/2015 | Kim et al. | |
| 9,139,363 B2 | 9/2015 | Lert | |
| 9,434,558 B2 * | 9/2016 | Criswell | B25J 5/007 |
| 9,520,012 B2 | 12/2016 | Stiernagle | |
| 9,550,626 B2 | 1/2017 | Parodi et al. | |
| 9,796,527 B1 | 10/2017 | Kaukl et al. | |
| 2008/0093313 A1 * | 4/2008 | Huber | B65G 1/0407 211/1.51 |
| 2008/0298943 A1 * | 12/2008 | Siegel | B65G 1/127 414/567 |
| 2010/0316468 A1 | 12/2010 | Lert et al. | |
| 2011/0313811 A1 * | 12/2011 | Urban | B60P 3/0257 705/7.25 |
| 2012/0118699 A1 | 5/2012 | Buchmann et al. | |
| 2015/0352721 A1 * | 12/2015 | Wicks | B25J 9/1664 700/228 |
| 2015/0360865 A1 * | 12/2015 | Massey | B65G 1/1373 414/275 |
| 2016/0075512 A1 | 3/2016 | Lert, Jr. | |
| 2017/0107056 A1 * | 4/2017 | Kadaba | B65G 67/04 |

FOREIGN PATENT DOCUMENTS

| | | | |
|---|---|---|---|
| DE | 3941754 A1 | 6/1991 | |
| DE | 102013008872 A1 | 11/2014 | |
| FR | 2292646 A1 | 6/1976 | |
| GB | 1516120 A | 6/1978 | |
| JP | S54-031175 A | 3/1979 | |
| JP | 61-114907 A | 6/1986 | |
| JP | H01-162611 A | 6/1989 | |
| JP | 05294181 | 11/1993 | |
| JP | 05294181 A * | 11/1993 | ............... B60P 1/36 |
| JP | 05294412 | 11/1993 | |
| JP | 05294412 A * | 11/1993 | ............ B65G 1/127 |
| JP | H05-319517 A | 12/1993 | |
| WO | 02074663 | 9/2002 | |
| WO | WO 2007/036250 A1 | 4/2007 | |
| WO | WO 2014/092145 A1 | 6/2014 | |
| WO | WO 2015/147033 A1 | 10/2015 | |

OTHER PUBLICATIONS

International Patent Application No. PCT/US2018/013920; Int'l Search Report and the Written Opinion; dated Jun. 21, 2018; 16 pages.
U.S. Appl. No. 15/797,562, filed Oct. 30, 2017, Kalm et al.
U.S. Appl. No. 15/721,280, filed Sep. 29, 2017, Kalm et al.
"Vertical Lift Modules—Shuttle XP Family Flexible Storage Solutions in a Compact Footprint"; http://www.kardexremstar.com/us/materials-handling-storage-solutions/vertical-lift-modules.html; kardexremstar; accessed Mar. 16, 2018; 8 pages.
"Modular Diamond Phoenix Horizontal Carousels"; https://www.modula.us/products/modula-diamond-phoenix-horizontal-carousels.html; Modula HC; accessed Mar. 16, 2018; 6 pages.
"Robots are AutoStore's iconic laborers"; http://www.autostoresystem.com/Products/Robot; AutoStore; accessed Mar. 19, 2018; 5 pages.
"3D-Matrix Solution"; https://www.ssi-schaefer.com/en-us/products/order-picking/automated-order-picking/3d-matrix-solution-53844; SSI Schafer; accessed Mar. 19, 2018; 4 pages.
"Dematic Multishuttle 2"; http://www.dematic.com/en-us/supply-chain-solutions/by-technology/storage-systems/dematic-multishuttle-2/; Dematic; accessed Mar. 19, 2018; 6 pages.
"AS/RS Solutions"; https://www.intelligrated.com/solutions/asrs-solutions; Honeywell Integrated; © 2018; accessed Mar. 19. 2018; 2 pages.
"AS/RS Systems for Distribution & Manufacturing"; http://www.cisco-eagle.com/material-handling-systems/asrs-systems; Cisco-Eagle; © 2018; accessed Mar. 19, 2018; 6 pages.
"Power Automation Systems—PowerStor Deep Lane ASRS"; https://www.youtube.com/watch?v=zJOAVOWluro; Power Automation Systems; Sep. 2011; accessed Mar. 19, 2018; 2 pages.
"AutoStore Logistic—Technical presentation"; https://www.youtube.com/watch?v=iyVDMp2bL9c; Aug. 2009; accessed Mar. 19, 2018; 3 pages.
"Scalable multi-level shuttle Navette at Karl Storz: A future-proof investments"; https://www.youtube.com/watch?v=jEvgkQFp1Uw; SSI Schafer; Jun. 2016; accessed Mar. 19, 2018; 2 pages.
"Automated Vertical Carousels"; https://www.youtube.com/watch?v=5STR9jKABxQ; Cisco-Eagle; Dec. 2015; accessed Mar. 19, 2018; 2 pages.
U.S. Appl. No. 15/408,128, filed Jan. 17, 2017, Titled: Stackable Storage Modules.
U.S. Appl. No. 15/408,182, filed Jan. 17, 2017, Titled: Container-Based Storage Using Stackable Storage Modules.

* cited by examiner

ITEM TRANSFER USING STACKABLE STORAGE MODULES

CROSS REFERENCE TO RELATED APPLICATIONS

This application is related to and incorporates by reference for all purposes the full disclosure of co-pending U.S. patent application Ser. No. 15/408,128, filed on Jan. 17, 2017, entitled "STACKABLE STORAGE MODULES" and co-pending U.S. patent application Ser. No. 15/408,182, filed on Jan. 17, 2017, entitled "CONTAINER-BASED STORAGE USING STACKABLE STORAGE MODULES", the contents of which are herein incorporated in their entireties.

BACKGROUND

Item storage facilities such as warehouses and distribution centers are designed to store inventory items. To this end, such facilities may include shelving units, such as vertical shelving units, where the inventory items are held until they are needed (e.g., to fulfill a customer order). A combination of automated and human operators may be required to place and remove inventory items from the shelving units. For instance, a human operator may be instructed to remove an item from a conveyor belt and place it on a particular shelf where the item will be stored for some period of time. When an order for the item is received, the human operator can navigate to a location in the warehouse where the shelf is located, and there retrieve the item to fulfill the order.

BRIEF DESCRIPTION OF THE DRAWINGS

Various examples in accordance with the present disclosure will be described with reference to the drawings, in which.

DETAILED DESCRIPTION

Figure 1:
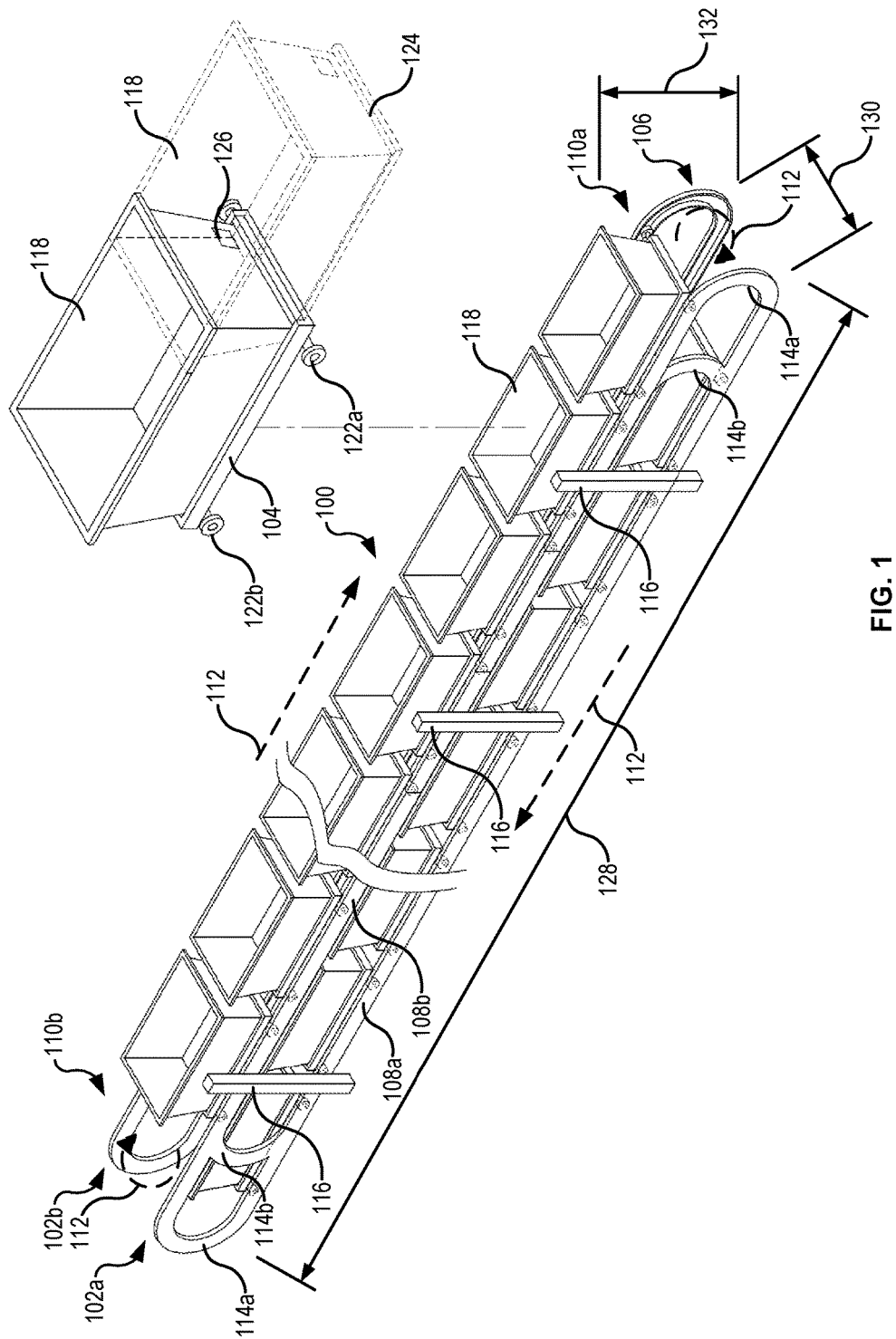
FIG. 1 illustrates a perspective view of an example stackable storage module, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Examples described herein are directed to devices, systems, and techniques for managing item storage and retrieval using stackable storage modules. In particular, the examples described herein may enable high-density storage systems including automated item storage and retrieval, with little to no human assistance. Such storage systems may be achieved by using an item movement management system (e.g., a set of computing devices) that coordinates the actions of automated material handling equipment, including stackable storage modules, using item-level data. The stackable storage modules in their various forms described herein may enable improved item storage and retrieval as compared to conventional storage techniques. For example, the stackable storage modules may enable improved storage density, decreased time needed for storage and retrieval of items, and fewer lost items. These improvements, along with others, may result in increased system throughput, decreased capital expenses for new storage facilities, and decreased overall operating costs.

The stackable storage modules are modular in the sense that each storage module is fully functional on its own, but is designed to enable grouping together in clusters (e.g., a group of more than one stackable storage module). When grouped into clusters, each stackable storage module remains independently controllable by the item movement management system. A cluster of stackable storage modules can be assembled in a fixed structure (e.g., in a warehouse to augment or replace vertical shelving units or other conventional storage means), in a mobile structure (e.g., a shipping container), and in other mobile and non-mobile arrangements. Use of clusters of stackable storage modules may enable increased flexibility with item storage. For example, small mini-warehouses (e.g., defined by one or more co-located shipping containers, each provided with one or more storage modules) may be temporarily constructed to support events such as tradeshows, concerts, sporting events, and other similar events. Similar mini-warehouses may be built on a temporary basis or on a more ongoing basis to, e.g., handle final-mile deliveries (e.g., the last leg of a delivery process). For example, temporary mini-warehouses may be set up in residential neighborhoods during seasons of high demand (e.g., Thanksgiving to New Year's) to help handle the flow of packages and other items. As described herein, each stackable storage module may hold items within a set of storage containers. These storage containers may be translated throughout the stackable storage module to present the storage containers at ends of the stackable storage module. At the ends, items held in the storage containers, and/or the containers themselves, can be manipulated (e.g., items removed from or stowed in the containers). When multiple stackable storage modules are provided, e.g., in shipping containers to be used in a cross-docking system, containers may be transferred between different modules, and items may be transferred between storage containers.

Turning now to a particular example, in this example, a stackable storage module is provided. The stackable storage module has an elongate shape that is longer than it is wide and tall. The stackable storage module is constructed to retain multiple storage containers (e.g., plastic totes in which can be held various items for storage) in a two-level, stacked arrangement (e.g., in the vertical direction). An elongate rigid frame of the stackable storage module defines the two levels, includes tracks oriented at each level, and includes connecting tracks for connecting tracks from the two levels. The tracks support carrier devices that are moveable with respect to the tracks along a predefined path (e.g., an oval shaped path). The moveable carrier devices are propelled by a drive motor that is local to the stackable storage module. The moveable carrier devices support the storage containers and move the storage containers vertically and horizontally as the moveable carrier devices move along the predefined path. When a particular storage container is required (e.g., to retrieve an item or to store an item), the drive motor is used to move the movable carrier devices along the predefined path until the particular storage container is at an access position. As the stackable storage modules are designed for vertically stacking, the access positions are likely disposed at either end of the elongate rigid frame.

Turning now to another particular example, in this example, a modular storage and retrieval system is implemented using stackable storage modules. This example modular storage and retrieval system includes a shipping container (e.g., an intermodal freight container) that is adapted to receive multiple stackable storage modules. The stackable storage modules can be designed to extend the entire length of the shipping container. The stackable storage modules are stacked on top of each other to build vertical stacks that are slightly shorter than the height of the shipping container. The total number of stacks depends on the width of each stack and the overall width of the shipping container (e.g., width of an interior and width of a door opening). The stackable storage modules of each stack can be loaded with items (e.g., into storage containers) while the stacks are outside of the shipping container. The stacks can then be moved (e.g., rolled) into the shipping container and housed therein during transportation. The stacks can also be moved into the shipping container first, and then loaded. An item movement management system can manage the operation of the modular storage and retrieval system. The item movement management system can perform a process for loading and/or unloading, which can include identifying a particular stackable storage module and causing a drive motor to translate carrier devices along the track to present the desired storage container at the door opening. The modular storage and retrieval system can also include material handling equipment such as robotic arms and conveyor belts housed in the shipping container. The material handling equipment, also under the management of the item management system, can be used for manipulating the items and storage containers of the stackable storage modules. For example, as the drive motors cause the carrier devices and storage containers to be sequentially presented at the ends of the stackable storage modules, the robotic arm can be used to manipulate the storage containers, the items stowed in the storage containers, and/or items to be stowed in the storage containers. The modular storage and retrieval system can be made up of a single shipping container or multiple shipping containers.

Turning now to yet another particular example, in this example, a modular storage and retrieval system is implemented using stackable storage modules in connection with an item transfer facility. The item transfer facility can be configured as a cross-dock inventory transfer facility. Thus, this system can be used for efficiently transferring items, storage containers, and/or stackable storage modules between shipping containers and/or between a shipping container and a different inventory handling process or location. The item transfer facility can be constructed to have a hub and spoke configuration, a tree and branch configuration, or other suitable configurations. Shipping containers including multiple stackable storage modules (e.g., in one or more sets of vertical stacks) are brought to openings in the item transfer facility (e.g., docks with doors). The inside of the item transfer facility includes material handling equipment to enable automated retrieval and placement of items. For example, a robotic arm located inside the item transfer facility, and under the management of an item movement management system, can be configured to remove containers and/or items from a stackable storage module housed in a shipping container. The robotic arm may then place the containers and/or items into a mobile storage structure, e.g., one capable of being transported by a robotic mobile drive unit. Thus, the robotic arm can access storage containers of the stackable storage modules to remove items, but then can hand off responsibility for the items to a different automated device (e.g., the robotic mobile drive unit). The robotic mobile drive unit then moves the item to a different location in the item transfer facility (e.g., to a different shipping container, to a delivery truck, to a packaging area, etc.).

Turning now to the figures, FIG. 1 illustrates an example stackable storage module 100, according to at least one example. The stackable storage module 100 includes a frame 102 including components 102a, 102b. The stackable storage module 100 also includes container carriers 104 and a movement system 106. The frame 102 is formed from a rigid material such as steel, iron, aluminum, high density plastics, or other similar materials. The components 102a, 102b are longitudinally narrow and spaced apart at a width corresponding to the container carrier 104 (e.g., to enable support of the container carriers 104). This spaced apart width, in some examples, may be greater than or equal to 18".

The frame 102 defines two levels, a lower level 108a and an upper level 108b. The lower level 108a is connected to the upper level 108b via a front connecting portion 110a and a rear connecting portion 110b. Structurally, each module 100 includes cross members that extend between components 102a and 102b and secure them together. These cross members are positioned out of the path of travel of the carriers and containers, e.g., being positioned along the bottom of each level 108a, 108b of the frame. The frame 102 can include tracks, grooves, pathways, rails, and other guiding structures configured along both levels 108 and the connecting portions 110 to define a carrier movement path 112, illustrated by the dashed arrows. For example, the connecting portions 110 can include at least two semi-circular portions 114a, 114b. The semi-circular portions 114 are constructed to enable vertical movement of the container carriers 104. In some examples, the semi-circular portions 114 have an arcuate shape that includes one or more curves. In some examples, the movement path 112 is defined as a loop, which may have a generally oval shape, rectangular shape, and other elongated shape.

The frame 102 may also include support structures 116, a few of which are labeled. The support structures 116 may be coupled to the two opposing components 102a, 102b or otherwise formed as part the frame 102. For example, a lower portion of the support structure 116 can be coupled to the lower level 108a and an upper portion of the support structure 116 may be coupled to the upper level 108b. Generally, the support structures 116 are configured to support the stackable storage module 100. In particular, the support structures 116 are configured to enable coupling of multiple stackable storage modules 100. For example, upper portions of the support structures 116 may be configured to couple with lower portions of corresponding support structures 116 of a different stackable storage module 100 disposed above the illustrated stackable storage module 100. In some examples, the support structures 116 define upper support surfaces at upper distal ends of the support structures 116 and lower support surfaces at lower distal ends of the support structures 116. In some examples, the upper distal ends are configured to couple with the lower distal ends. For example, the upper distal ends can have female ends configured to receive corresponding male ends of the lower distal ends. The frame 102 may also include cross members that extend between and connect the components 102a, 102b. The cross members may be positioned out of the path of travel of the container carriers 104 and the storage containers 118, e.g., may be positioned along the bottom of each level 108a, 108b.

The container carriers 104 may be disposed on each level 108 (e.g., in communication with the guiding structures) and configured to support storage containers 118. In some examples, the stackable storage module 100 may be defined by a pair of parallel planes that encloses the used volume of the stackable storage module 100. For example, a first, upper plane may be aligned with the top edges of the storage containers 118 disposed on the upper level 108b. A second, lower plane may be aligned with an underside of the container carriers 104 disposed on the lower level 108a (e.g., below the underside of the container carriers 104 disposed on the lower level 108a).

The container carriers 104 may be moveable along the movement path 112 (e.g., horizontally along each level 108 and along the arcuate paths at each connecting portion 110a, 110b) between the two horizontal planes defined above. The movement system 106, as illustrated in greater detail with reference to FIGS. 4-7, may cause the container carriers 104 (and the corresponding storage containers 118) to sequentially move along the carrier movement path 112 to present individual container carriers 104 at the ends of the frame 102. For example, the movement system 106 may include a linear drive motor and a continuous chain or belt that drives each container carrier 104. In some examples, the movement system 106 moves only one or a few of the container carriers 104 which then push the other container carriers 104 through the carrier movement path 112. In other examples, at least some of the container carriers 104 are themselves mechanized for movement (e.g., include driven electric wheels, nanorobots, or the like) independent of a local movement system 106. In this manner, the mechanized container carriers 104 can drive themselves, and, in some examples, may be used to push the other container carriers 104 through the movement path 112. The movement system 106 may also include a set of electromagnets to propel the container carriers 104. In some examples, the drive motor or other parts of the movement system 106 may be positioned and secured in such a way as to be replaceable by a robotic manipulator.

In some examples, the movement system 106 may include a movement device that is fixedly attached to the frame 102. In this example, the movement device may be connected to a power source via a connector. Communication connections between the movement device and a computing device may be achieved via the connector and/or via a wireless network connection. In some examples, the frame 102 may include an interface to receive the movement device. For example, the interface may be akin to a power take off device or other coupling to receive the movement device. In this manner, the movement device may be "plugged" into the interface to cause the movement of the container carriers 104. This may provide for easy replacement of the movement device and/or utilization of a single movement device for more than one stackable storage module 100.

In some examples, the movement system 106 may include an inductive electric motor inductively coupled to the frame 102. In this example, a stationary field generator may be used to induce a current in the container carriers 104 that would interact with the electric field to generate motion. This may also be performed with magnets, or steel plates (reluctance) that interact with one or more stationary field generators.

In some examples, instead of or in addition to the movement system 106, the action of placing or removing storage containers 118 may be used to cause movement of the container carriers 104. In some examples, the frame 102 may have a slight angle that may allow container carriers 104 to flow from one level to the other.

The container carrier 104 may include a support surface to support an underside of the storage container 118. The support surface may include a platform, a set of grooves, notches, or the like to receive the storage container 118 and retain the storage container 118 at a fixed location. The container carrier 104 may also include a set of wheels 122. The wheels 122 may be configured to engage with the frame 102 to enable rolling movement of the container carrier 104 with respect to the frame 102. In some examples, instead of or in addition to the wheels 122, the container carrier 104 includes a set of surfaces to enable sliding movement of the container carrier 104 with respect to the frame 102. For example, these surfaces may be formed from a low friction material, or a combination of one wheel and one or more sliding surfaces. In some examples, a single wheel 122 may be used. For example, a single wheel may be mounted above the center of mass of the container carrier 104 and/or the storage container 118.

As illustrated, the container carrier 104 may provide for independent movement. For example, the container carrier 104 may include a moving surface 124 that is configured to translate away from the main body of the container carrier 104. The moving surface 124 can be connected to the main body of the container carrier 104 via a set of extendable rail slides (e.g., drawer slides) or other comparable structure. The container carrier 104 may be mechanized to enable the translation depicted in FIG. 1 and other movements. For example, a linear actuator may be coupled to the moving surface 124 to push the moving surface 124 away from the main body of the container carrier 104 and pull the moving surface 124 back toward the container carrier 104. Such movement may be useful for accessing an interior of the storage container 118 (e.g., to retrieve and place items) when the storage container 118 is located at an access position.

The storage container 118 may be any suitable storage container configured to be received by the container carrier 104 and to hold items. For example, the storage container 118 may be a rectangular structure formed from a rigid material such as high-density plastic, wood, aluminum, or other similar material. The storage container 118 may include an identifier 126 (e.g., bar code, QR code, radio-frequency identification (RFID) tag, and any other suitable identifier). The identifier 126 may be used to uniquely identify the storage container 118. In some examples, the identifier 126 may include non-volatile data storage, which may be associated with the storage container 118 and/or its contents. Data can be read/written to the data storage each time the stackable storage module 100 is accessed. This data may contain status of the stackable storage module 100, inventory stowed in the stackable storage module 100, and/or destination information for each storage container 118. In this manner, inventory information may be updated when the identifiers 126 are read.

In some examples, the container carrier 104 also includes an identifier. The identifiers may be used to identify a position of the container carrier 104 (and the storage container 118) with respect to the stackable storage module 100. In some examples, the stackable storage module 100 (or system in which the stackable storage module 100 is implemented) may include any suitable combination of encoders, RFID readers and antenna, cameras, and/or other sensing devices for identifying and locating the container carriers 104 and/or the storage containers 118.

The size of the storage container 118 may be selected to optimize storage density of the stackable storage module 100 or other suitable parameter. This may depend on the size and type of items to be stored in the storage container 118. For example, the storage container 118 may have a height of about 18", a width of about 18", and a length of about 24".

In some examples, the dimensions of the storage container 118 are different than those just recited. The items held by the storage container 118 can be any suitable item stored in a material storage facility including, for example, personal electronic devices, computers, recreational equipment, food products, television sets, clothing, household supplies, automotive parts, books, loaded pallets, and any other suitable object capable of being stored.

The distances between the two levels 108 may be selected to provide clearance for the storage containers 118. This distance may also be selected to optimize storage density of the stackable storage module 100 or other suitable parameter. For example, a vertical dimension between a top surface of a storage container 118 on the lower level 108a and a bottom surface of a container carrier 104 disposed directly above on the upper level 108b may be between 1-2", leaving room for cross members as needed. A longitudinal distance separating each container carrier 104 and/or each storage container 118 may be selected to optimize storage density of the stackable storage module 100 or other suitable parameter. For example, this longitudinal distance may fall within the range of 1-2". In some examples, these dimensions may be different than just recited. Alternatively, the container carriers can contact one another, e.g., in an embodiment in which the container carriers each push adjacent carriers to move the carriers along the frame.

The overall dimensions (e.g., length 128, width 130, and height 132) of the stackable storage module 100 may be selected to optimize storage density of the stackable storage module 100 or other suitable parameter. For example, the dimensions 128-132 may be selected to fit within a particular structure (e.g., a shipping container). In this example, the length 128 may correspond to a length of the shipping container. The other dimensions, the width 130 and the height 132, may be selected to optimize storage density within the shipping container.

In some examples, the stackable storage module 100 also includes one or more sensors to provide sensor data that can be used to manage the operation of the stackable storage module 100. For example, a position sensor may be used to detect positions of the storage container carriers and/or containers 118. As an additional example, an optical scanner may be used to scan the identifier 126. Other sensors relating to control of the drive motor of the movement system 106 may also be provided. In some examples, other sensors are provided to detect when items protrude out of the storage containers 118 in a way that could be problematic. For example, because the tolerances between the levels 108 may be very tight, it may be desirable that items do not extend beyond a top of the storage containers 118.

The stackable storage module 100 may also include any suitable number of mechanical connections, electrical connections, and network connections to stabilize each module or stack of modules, and to implement the techniques described herein. For example, the mechanical connections may be used to couple two or more stackable storage modules 100 together. The electrical connections may be used to provide power to each movement system 106 and other electrical devices (e.g., sensors). The network connections may enable computer control of the stackable storage modules 100. In some examples, the stackable storage module 100 may include a local computing device, control chip, or other device to control the operation of the stackable storage module 100. The device may include non-volatile data storage to store certain data associated with the stackable storage module 100. For example, such data may include location data for storage containers 118, location data for items in the storage containers 118, and an order of the storage containers 118 (e.g., location of a storage container 118 with respect to other storage containers 118 and/or the carrier movement path 112).

Figure 2:
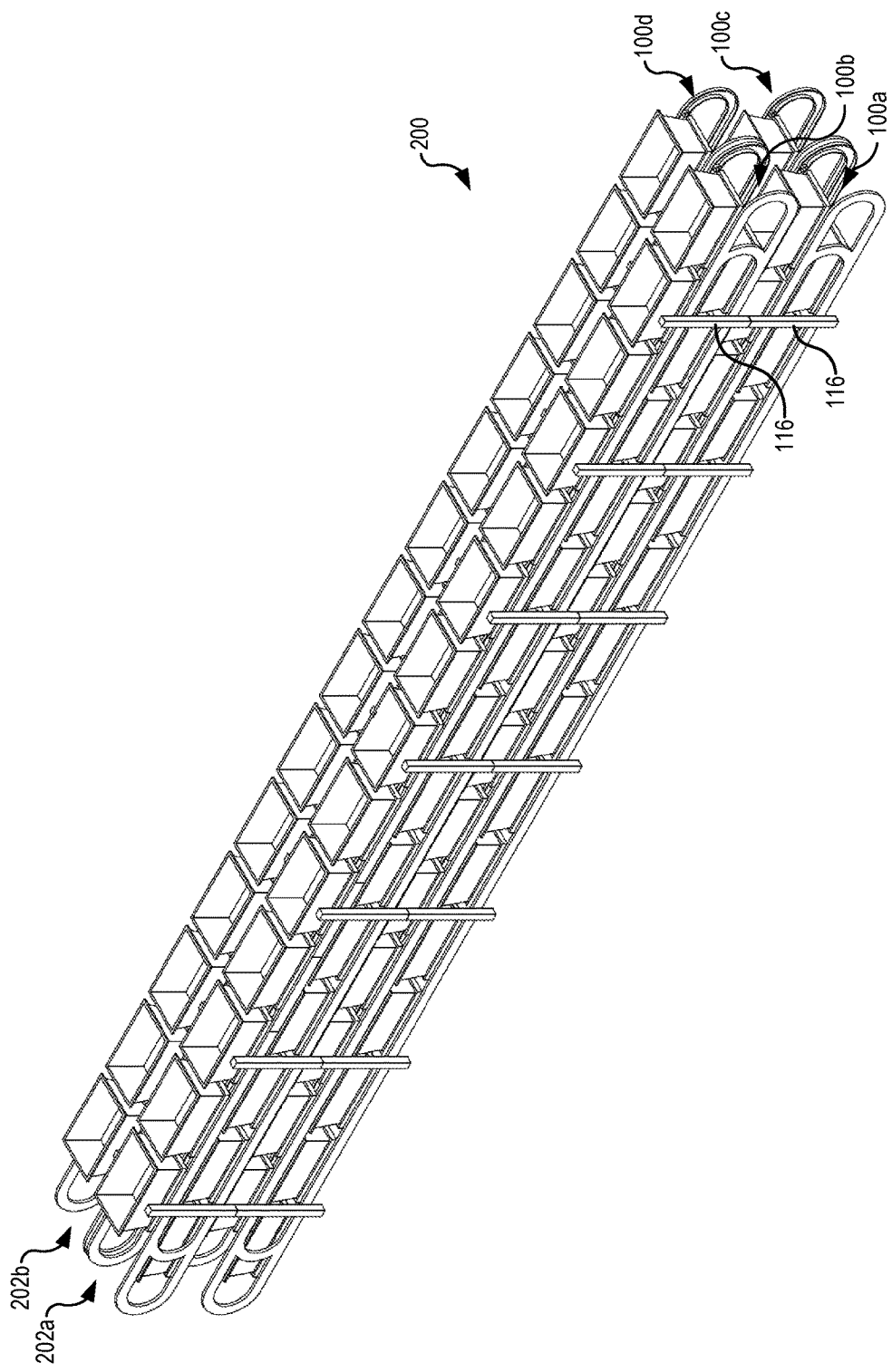
FIG. 2 illustrates a perspective view of an example cluster of stackable storage modules, according to at least one example.

FIG. 2 illustrates an example cluster 200 of stackable storage modules 100, according to at least one example. The cluster 200 is included to depict how stackable storage modules 100 may be stacked vertically on top of each other and horizontally next to each other. For example, the stackable storage modules 100b, 100d are stacked respectively on top of the stackable storage modules 100a, 100c to form stacks 202a, 202b. The two stacks 202a, 202b are disposed next to one other. To add rigidity to the cluster 200, the sides of the support structures 116 may be coupled together. In some examples, other structures are provided to enable side-to-side coupling of the stacks 202.

In some example, upper distal portions of the support structures 116 of the stackable storage modules 100a, 100c are in physical contact with lower distal portions of the support structures 116 of the stackable storage modules 100b, 100d. As each of the stackable storage modules 100 include separate movement systems 106, each may be moved independently of the others.

Figure 3:
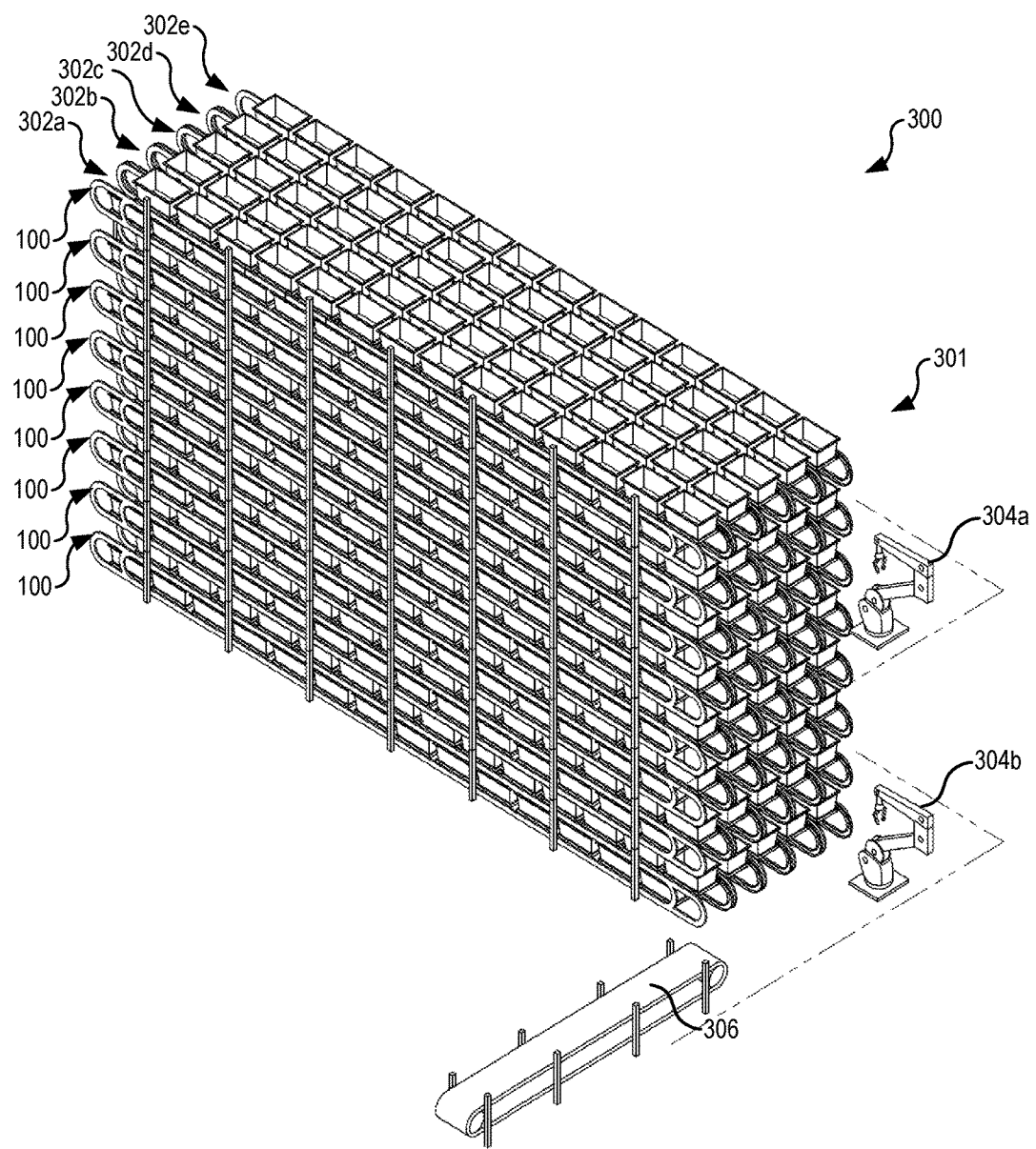
FIG. 3 illustrates a perspective view of an example modular storage and retrieval system including a cluster of stackable storage modules, according to at least one example.

FIG. 3 illustrates an example modular storage and retrieval system 300 including a cluster 301 of stackable storage modules 100, according to at least one example. The cluster 301 is an example of the cluster 200. The cluster 301 includes vertical stacks 302a-302e, each including a plurality of stackable storage modules 100 (e.g., eight stackable storage modules 100). The plurality of stackable storage modules 100 are stacked on top of each as described herein. In some examples, the vertical stacks 302 may be coupled to each other in any suitable manner. In other examples, the vertical stacks 302 may be configured to move laterally and independently of adjacent stacks. For example, the vertical stacks 302 may be mounted for movement in tracks or rails that extend in a direction generally perpendicular to the lengths of the modules and, in some examples, attached to a drive system to enable such movement. This may enable access to the sides of the inner stackable storage modules (e.g., those in the vertical stacks 302b-302d) by creating dynamic aisles between the vertical stacks 302. This may enable maintenance of the stackable storage modules 100.

The modular storage and retrieval system 300 may also include one or more robotic manipulators 304 and other material conveyance device(s) 306. In this example, the cluster 301 may be disposed within a warehouse or other facility and the two robotic manipulators 304 may be disposed on different mezzanines or floors of the facility (as depicted by the phantom lines). In this example, each robotic manipulator 304 is configured to interact with one half of the stackable storage modules 100 of the cluster 301. For example, the robotic manipulator 304a is configured to interact with an upper half of the stacked stackable storage modules 100. Likewise, the robotic manipulator 304b is configured to interact with a lower half of the stacked stackable storage modules 100. A capacity of the robotic manipulators 304 may be matched to the number of individual stackable storage modules 100 each is required to service. For example, assuming the robotic manipulator 304a were capable of removing 20 items per minute from storage containers of the stackable storage modules 100, the robotic manipulator 304a may be able to service all twenty stackable storage modules 100 in the entire upper portion of the cluster 301. This may enable constant movement of the robotic manipulator 304a while the individual stackable storage modules 100 move their respective storage containers 118 to access positions (e.g., positions near the ends of the stackable storage modules 100 where the robotic manipulator 304a can have unimpeded access to the storage containers 118). In some examples, the robotic manipulators 304 or other material handling device may be configured to move vertically and/or horizontally to service the cluster 301. For example, the robotic manipulator 304a may be mounted on a horizontal and/or vertical track to enable it to move with respect to the vertical stacks 302.

The robotic manipulator 304 may be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects). The robotic manipulator 304 may include any suitable type and number of sensors disposed throughout the robotic manipulator 304 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 304, including an end effector. The sensors may be in communication with a management device that is local to the robotic manipulator (e.g., a robotic manipulator controller) and/or may be in direct communication with an item movement management system 1702. In this manner, the management device may control the operation of the robotic manipulator 304 and the end effector based at least in part on sensing information received from the sensors. The sensors may include any suitable combination of sensors capable of detecting depth of objects, capturing RGB and other images of objects, scanning machine-readable information, capturing thermal images, detecting position and orientation of objects, and performing any other suitable sensing as described herein.

In some examples, depending on the application for the robotic manipulator 304, different end effectors (e.g., end of arm tools) may be selected. Information about the end effectors available may be organized in terms of grasping function. A grasping function may define functionally how an end effector is capable of manipulating an object. The grasping function may differ between end effectors with respect to capacities, categories, and physical limitations. Example categories of end effectors include: soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferromagnetic particles capable of altering a size or shape of the fluid volume when subjected to a magnetic field). Vacuum end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

The other material conveyance devices 306 may also be disposed on each floor adjacent to the robotic manipulators 304. The other material conveyance devices 306 can be any suitable material conveyance system including, for example, a horizontal conveyor belt system, a pneumatic conveyor system, a vibrating conveyor system, a flexible conveyor system, a vertical conveyor system, a spiral conveyor system, an overhead conveyor system, and/or any other suitable material conveyance system suitable for conveying items. The other material conveyance devices 306 may be used to transport items and/or storage containers 118 to and from the robotic manipulators 304. In some examples, first other material conveyance devices 306 transport items to the robotic manipulators 304 for placement in the storage containers of the stackable storage modules 100. Second other material conveyance devices 306 may transport other items from the robotic manipulators 304 (e.g., items that have been removed from the storage containers 118 of the stackable storage modules 100) to other locations within the facility (e.g., packaging, labeling, inspection, etc.).

The modular storage and retrieval system 300 (and the other modular storage and retrieval systems described herein) may include means for inspection, repairs, and removal of jams of the stackable storage modules 100. For example, a container carrier 104 may be adapted to support inspection or service equipment, e.g., a robotic manipulator configured to inspect the stackable storage modules 100, remove jams, and perform certain maintenance. As described herein, the vertical stacks 302 may also be moveable to allow access to all of the stackable storage modules 100.

Figure 4:
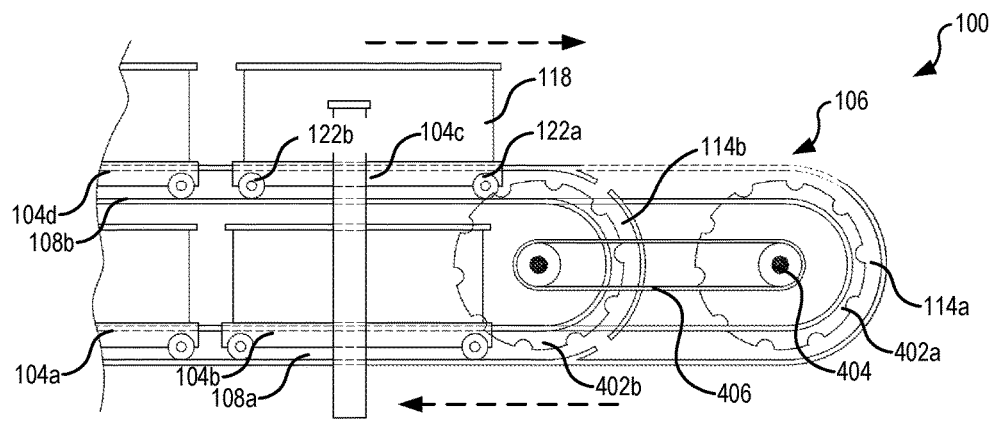
FIG. 4 illustrates a side view of an end of an example stackable storage module, with container carriers at a first state, according to at least one example.
Figure 5:
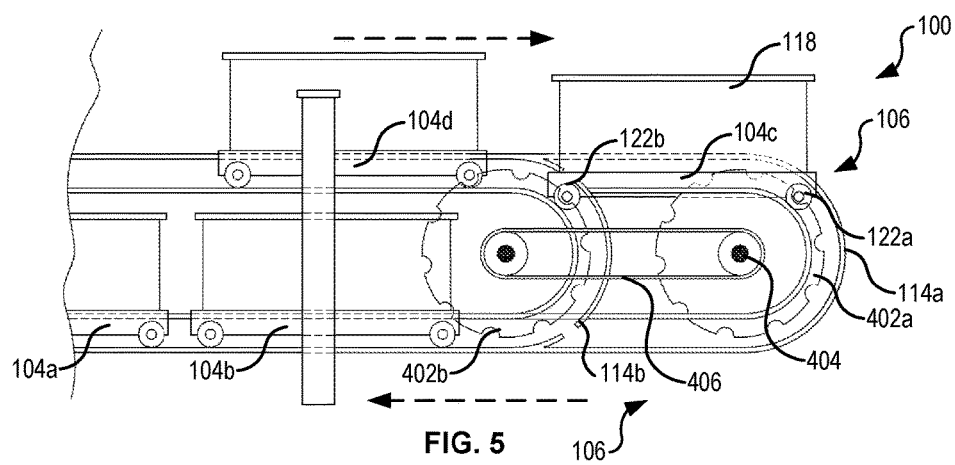
FIG. 5 illustrates a side view of the end of the example stackable storage module of FIG. 4, with the container carriers at a second state, according to at least one example.
Figure 6:
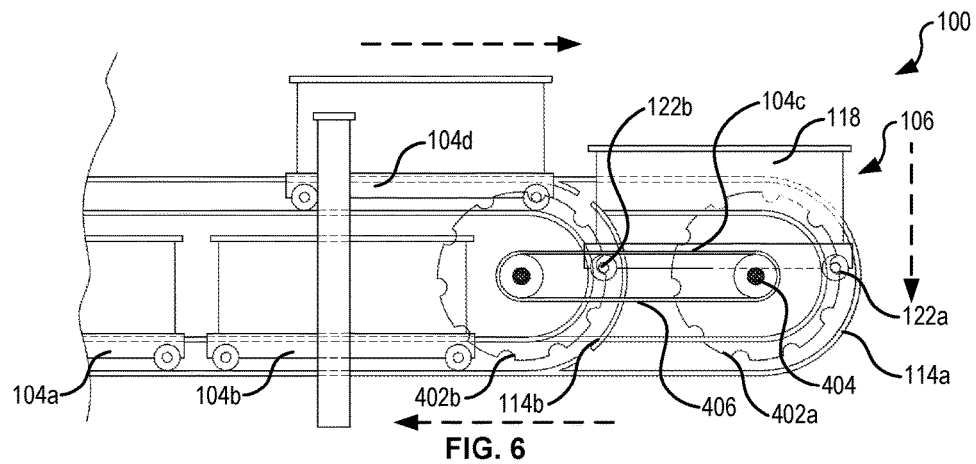
FIG. 6 illustrates a side view of the end of the example stackable storage module of FIG. 4, with the container carriers at a third state, according to at least one example.
Figure 7:
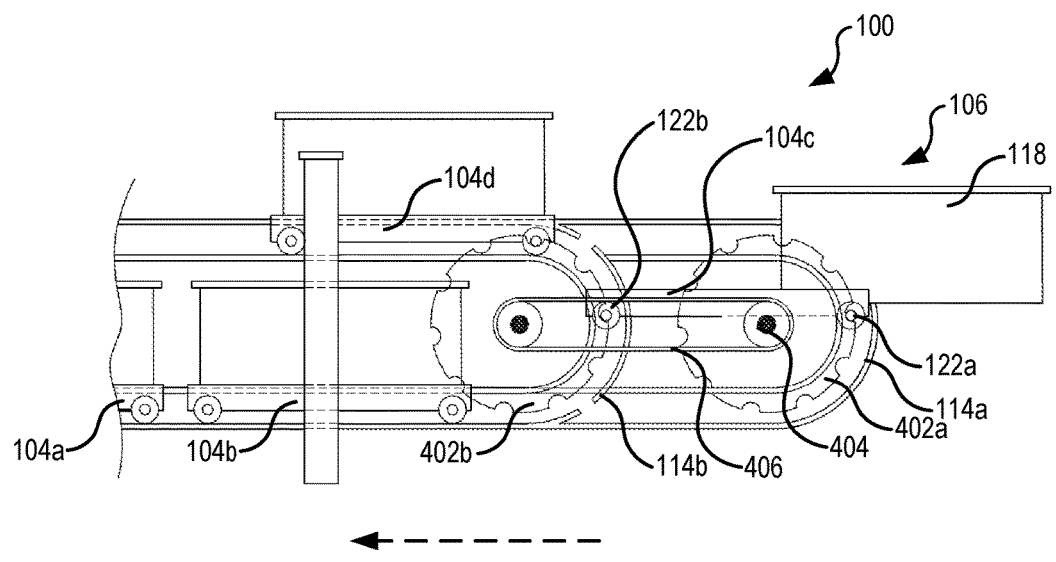
FIG. 7 illustrates a side view of the end of the example stackable storage module of FIG. 4, with a particular container carrier in an extended position, according to at least one example.

FIGS. 4-7 illustrate an end of an example stackable storage module 100, with the container carriers 104 at various states, according to at least one example. In particular, the views shown in these figures are taken as a longitudinal profile extending between the two components 102a, 102b. FIG. 4 illustrates container carriers 104a-104d at first states, FIG. 5 illustrates container carriers 104a-104d at second states, FIG. 6 illustrates container carriers 104a-104d at third states, and FIG. 7 illustrates container carriers 104a-104d at fourth states.

In FIG. 4, the container carriers 104c, 104d are located on the upper level 108b of the stackable storage module 100. The container carriers 104a, 104b are located on the lower level 108a. The wheels 122a, 122b of the container carrier 104c are illustrated and labeled. The stackable storage module 100 also includes the semi-circular portions 114 (e.g., an outer semi-circular portion 114a and an inner semi-circular portion 114b). In FIG. 4, the container carrier 104c is approaching the semi-circular portions 114a, 114b. For example, the movement system 106 may be causing the container carriers 104 to move in the direction of the dashed arrows (e.g., to the right on the upper level 108b and to the left on the lower level 108a). The movement system 106 may also be configured to cause the container carriers 104 to move in the opposite direction (e.g., to the right on the lower level 108a and the left on the upper level 108b). In this manner, the movement system 106 may enable bidirectional movement.

The movement system 106 may include any suitable number of devices, gears, drives, chains, belts, motors, and the like to cause the container carriers 104 to translate along the different levels 108 and between the levels 108. For example, the movement system 106 may include a set of carrier gears 402a, 402b. The carrier gears 402 may be disposed within the semi-circular portions 114 to carry the container carriers 104 through the curves defined by the semi-circular portions 114. For example, one or more carrier gears 402a may be associated with the outer semi-circular portions 114a and one or more carrier gears 402b may be associated with the inner semi-circular portions 114b. The carrier gears 402 may be configured to engage with the wheels 122 and/or axles of the wheels as the wheels 122 are brought near the carrier gears 402. For example, the front wheels 122a may engage with the carrier gear 402a and the rear wheels 122b may engage with the carrier gear 402b. In some examples, at least one of the carrier gears 402 may be driven by a drive motor 404. The drive motor 404 may be a linear drive motor that spans the two sub-components of the frame 102. In some examples, the drive motor 404 is a flat drive motor that is mounted on an outward facing surface of the carrier gear 402. The drive motor 404 may drive one or both carrier gears 402 via a drive mechanism such as a chain or belt 406.

In some examples, the carrier gears 402 are not connected to the drive motor 404. In this example, the carrier gears 402 may simply function to support the container carriers 104 as they move through the ends of the frame 102.

In some examples, the drive motor 404 may be coupled to a continuous chain that runs along the inner semi-circular portions 114b of the stackable storage module 100. In some examples, the container carriers 104 may be attached to the chain at a fixed location on the chain. In other examples, the container carriers 104 include a clamp, hook, or other device that selectively engages with the chain. For example, the container carriers 104 may be attached to the chain as they move horizontally along the levels 108, but may be detached from the chain as the container carriers 104 move vertically at the connecting portions 110. The movement system 106 may engage with an underside, middle portion of an example container carrier 104. The movement system 106 may also engage with one or both exterior edges of the container carrier 104 (e.g., at or near the wheels 122).

In FIG. 5, the container carrier 104d is located on the upper level 108b of the stackable storage module 100. The container carriers 104a, 104b are located on the lower level 108a. The rear wheels 122b of the container carrier 104c and the front wheels 122a of the container carrier 104c are beginning to advance into the semi-circular portions 114a, 114b. In the example, the wheels 122a may engage with cogs of the carrier gear 402a. At or about the same time, the wheels 122b may engage with cogs of the carrier gear 402b. The wheels 122 may remain in the cogs at least until the container carrier 104c has moved from the upper level 108b to the lower level 108a.

In FIG. 6, the container carrier 104d is located on the upper level 108b of the stackable storage module 100. The container carriers 104a, 104b are located on the lower level 108a. The container carrier 104c is located between the lower level 108a and the upper level 108b. In this example, the container carrier 104c has moved vertically down from the upper level 108b. In this example, the rear wheels 122b of the container carrier 104c are disposed entirely within the inner semi-circular portions 114b (and being carried by the carrier gear 402b) and the front wheels 122a of the container carrier 104c are disposed entirely within the outer semi-circular portions 114a (and being carried by the carrier gear 402a). In some examples, the container carrier 104c is held in the position illustrated by FIG. 6. This may achieved by stopping the drive motor 404, causing brake mechanisms on the container carrier 104c to engage with the inner semi-circular portions 114b and/or the outer semi-circular portions 114a or in any other suitable manner. The wheels 122 may be configured to translate to adjust the distance between the front wheels 122a and the rear wheels 122b. For example, the mounts for the wheels 122 on the container carrier 104 may include springs that are biased between the wheel axles and the body of the container carrier 104. This may be desirable to cause the wheels 122 to translate towards each other in order to engage with a front surface of the inner semi-circular portion 114b and a rear surface of the outer semi-circular portion 114a.

The state of the container carrier 104c in FIG. 6 may correspond to an access position. For example, an interior of the storage container 118 of the container carrier 104c may be accessible when the container carrier 104c is in the illustrated state. When another stackable storage module 100 is stacked on top of the illustrated stackable storage module 100, the illustrated state may provide additional clearance between the two stackable storage modules 100 to enable access to the storage container 118. In some examples, the container carrier 104c may be rotated, tipped, translated, or otherwise adjusted to improve access to the interior of the storage container 118. For example, as illustrated in FIG. 7, the container carrier 104c includes a moving surface (e.g., similar to the surface 124 in the embodiment of FIG. 1) on which the storage container 118 is held. In the example illustrated by FIG. 7, the storage container 118 has been translated to enable access to the interior of the storage container 118. In some examples, the translation and/or rotation is selectable (e.g., only performed when needed, not on every container carrier 104 that cycles through the access position). In other examples, the translation and/or rotation is performed on every container carrier 104 that cycles through the access position.

Figure 8:
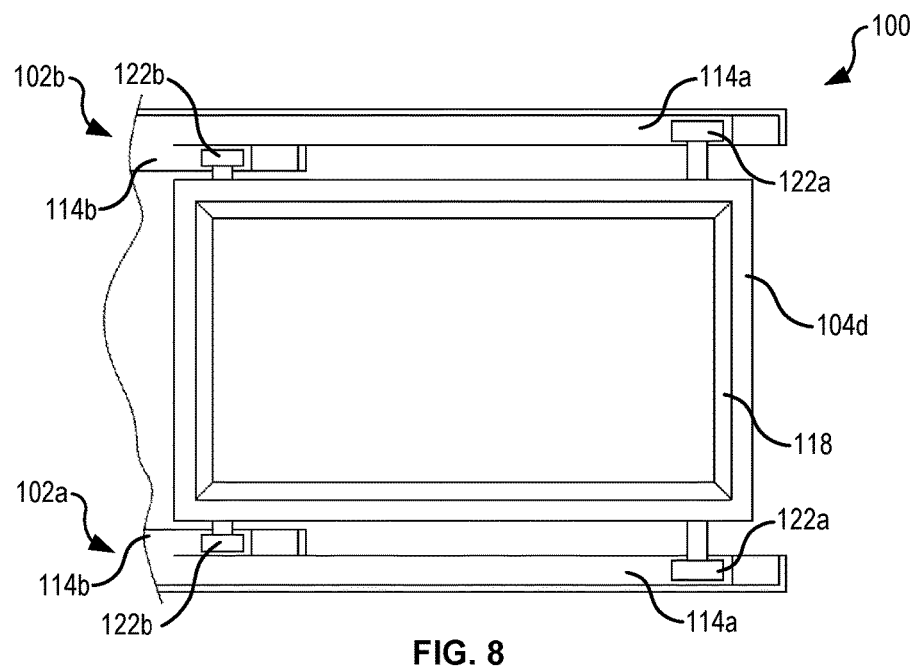
FIG. 8 illustrates a top view of the end of the example stackable storage module of FIG. 4, according to at least one example.

FIG. 8 illustrates a top view of the container carrier 104c at the state illustrated in FIG. 5. In particular, the rear wheels 122b are shown approaching openings defined by the inner semi-circular portions 114b. The front wheels 122a may have a wider wheelbase than the rear wheels 122b. In this manner, the front wheels 122a may pass by the inner semi-circular portions 114b within their own tracks that are part of the outer semi-circular portions 114a. Because of the narrower wheelbase of the rear wheels 122b, the rear wheels 122b may enter the inner semi-circular portions 114b at about the same time as the front wheels 122a enter the outer semi-circular portions 114a. The carrier gears 402 may be configured to engage with the wheels 122 as they enter the semi-circular portions 114. At an opposite end of the stackable storage module 100 according to this example, the rear wheels 122b may be leading wheels, and the front wheels 122a may be trailing wheels. Thus, at the opposite end, the rear wheels 122b roll in the outer semi-circular portions 114a and the front wheels 122a roll in the inner semi-circular portions 114b.

Figure 9:
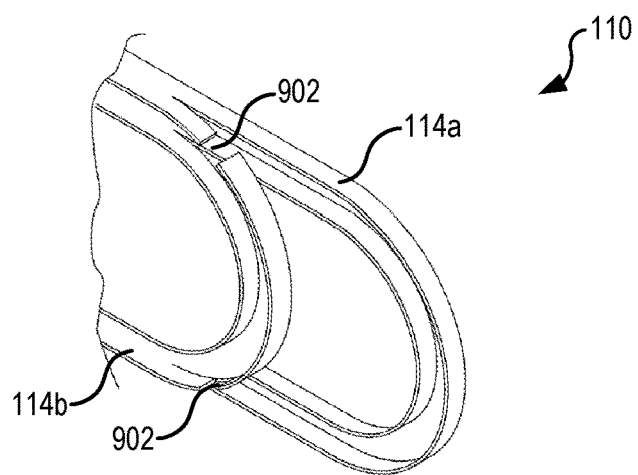
FIG. 9 illustrates a perspective view of a connecting portion of the example stackable storage module of FIG. 4, according to at least one example.

FIG. 9 illustrates a perspective view of the connecting portion 110 of the example stackable storage module of 100, according to at least one example. The connecting portion 110 is part of one of the components 102a of the frame 102. In particular, the illustrated connecting portion 110 together with a mirrored version of the connecting portion 110 may make up a complete end portion of the frame 102.

The connecting portion 110 may include the outer semi-circular portion 114a and the inner semi-circular portion 114b. The inner semi-circular portion 114b may define a first wheel track for the rear wheels 122b. The outer semi-circular portion 114a may define a second wheel track for the front wheels 122a. Axles of the front wheels 122a may pass through axle openings 902 disposed in the inner semi-circular portion 114b as the front wheels 122a move along the second wheel track. At an opposite end of the stackable storage module 100 according to this example, the inner semi-circular portion 114b may be configured to carry the front wheels 122a (e.g., part of the second wheel track), and the outer semi-circular portion 114a may be configured to carry the rear wheels 122b (e.g., part of the first wheel track).

Figure 10:
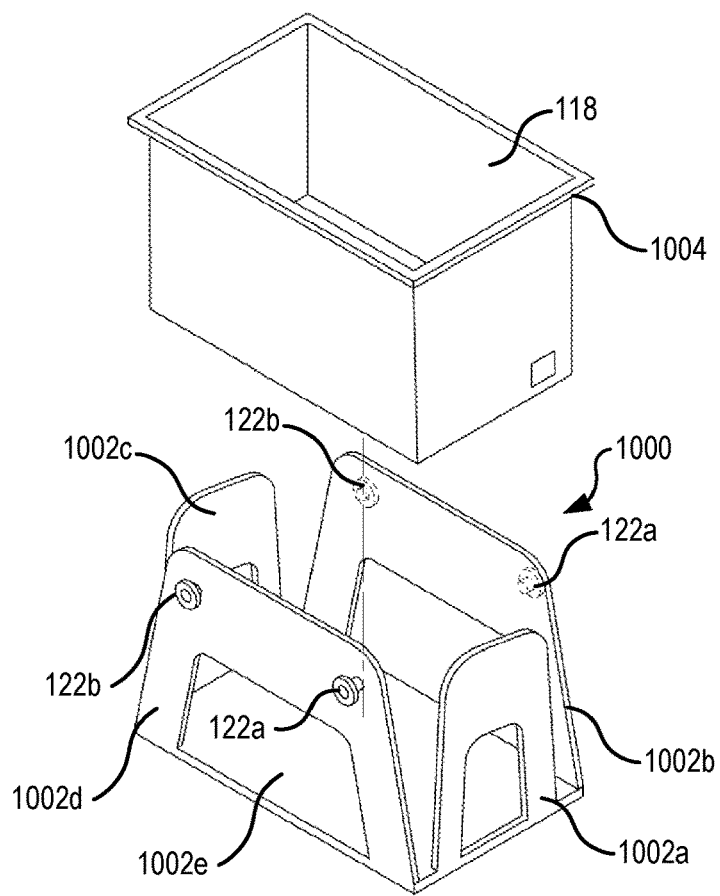
FIG. 10 illustrates a perspective view of an example container carrier and storage container, according to at least one example.

FIG. 10 illustrates a perspective view of an example container carrier 1000 and the storage container 118, according to at least one example. The container carrier 1000 may be configured to receive the storage container 118 within a frame 1002. The frame 1002 may be made up of a set of frame components 1002a-1002e. The storage container 118, when inserted into the container carrier 1000, may be supported by a bottom frame component 1002e and the frame components 1002a-1002d. The container carrier 1000 may include the front wheels 122a and the rear wheels 122b attached to or otherwise mounted to the container carrier 1000.

In some examples, instead of or in addition to the set of frame components 1002a-1002e, the container carrier 1000 may include a hoop frame to which the wheels 122 may be attached. The hoop frame may be sized to receive the storage container 118 and engage with a lip 1004 of the storage container. In this manner, the hoop frame may support the storage container 118 by the lip 1004, instead of or in addition to the container carrier 1000 supporting the storage container 118 by an underside of the storage container 118.

Figure 11:
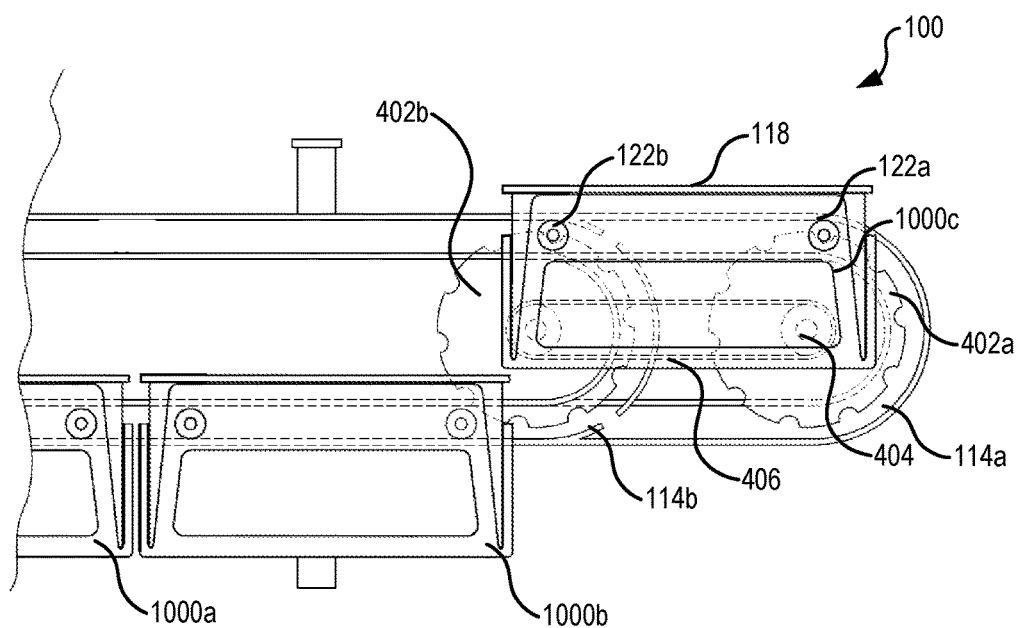
FIG. 11 illustrates a side view of an end of an example stackable storage module including the example container carrier of FIG. 10, according to at least one example.

FIG. 11 illustrates a side view of an end of the stackable storage module 100 including a set of container carriers 1000, according to at least one example. The stackable storage module 100 may function to move the set of container carriers 1000 through the semi-circular portions 114 as described with reference to FIGS. 4-7. In this example, however, because the container carriers 1000 are being utilized, the center of mass of the storage container 118 may be located at or below mounting locations of the wheels 122 on the container carrier 1000. In the container carriers 104, mounting locations of the wheels 122 may be located below the center of mass of the storage container 118.

Figure 12:
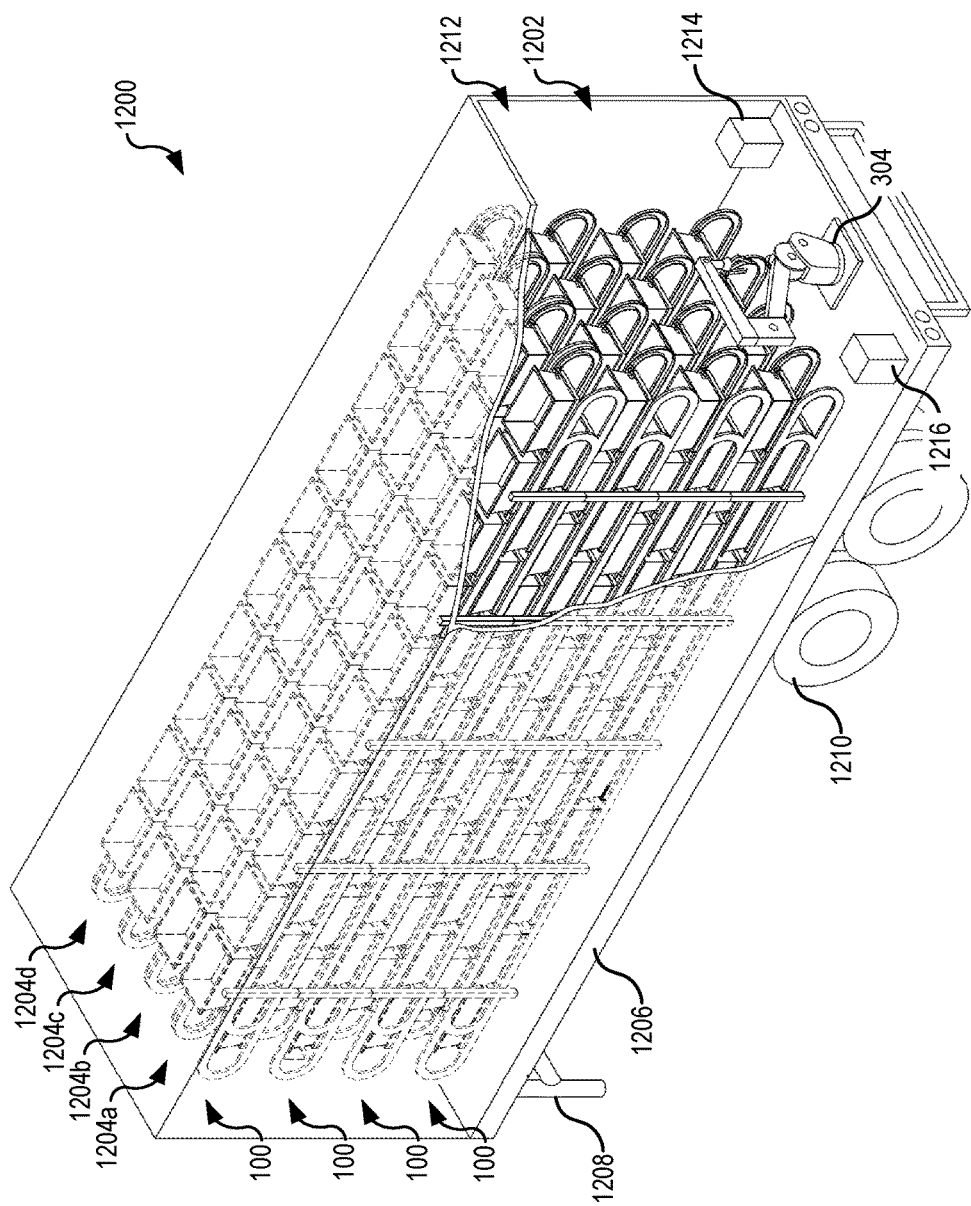
FIG. 12 illustrates a perspective view of an example mobile storage and retrieval system including stackable storage modules, according to at least one example.

FIG. 12 illustrates an example modular storage and retrieval system 1200 including stackable storage modules 100, according to at least one example. In particular, the modular storage and retrieval system 1200 may include a cluster 1202 of stackable storage modules 100. The stackable storage modules 100 are formed into a plurality of vertical stacks 1204a-1204d disposed side-by-side. The cluster 1202 is located within a shipping container 1206. The number of stackable storage modules 100 may be selected to optimize storage density in the shipping container 1206. The shipping container 1206 may be any suitable container such as a tractor trailer or an intermodal freight container, any of which may be specially adapted to receive the cluster 1202 or may be conventional. For example, the illustrated shipping container 1206 may be a shipping container that is coupled to a semi-trailer 1208. Thus, the shipping container 1206 may be removable from the semi-trailer 1208 and placed on a different semi-trailer, onto a rail car, stacked on a shipping vessel, or at any other suitable location. The semi-trailer 1208 may include a set of wheels 1210 and may be configured to be couple with a tractor unit (e.g., semi-truck) to pull the semi-trailer 1208. In some examples, the shipping container 1206 is a box portion of the semi-trailer 1208, which may not be removable from the semi-trailer 1208.

Each stackable storage module 100 in the different vertical stacks 1204 may operate as an independent unit to cause the carriers 104 (and the storage containers 118) to be sequentially presented at a rear portion 1212 of the shipping container 1206 (e.g., near an opening of the shipping container 1206). Thus, the access position for each stackable storage module 100 may be located at the rear portion 1212. Of course, depending on the alignment of the stackable storage modules 100 within the shipping container 1206, the access position may be located at other portions of the shipping container 1206 (e.g., a front portion, side portion, etc.). In some examples, a single vertical stack 1204 and/or a single stackable storage module 100 may be included in the shipping container 1206. For example, a single stackable storage module 100 may be arranged in a serpentine configuration having one or more vertical loops and/or one or more horizontal loops.

The modular storage and retrieval system (MSR) 1200 may also include a robotic manipulator 304 disposed at the rear portion 1212. The robotic manipulator 304 may be configured to manipulate items and/or storage containers 118 held by the stackable storage modules 100. Instead of or in addition to the robotic manipulator 304, the MSR system 1200 may include a different material conveyance device such as a conveyor belt. The material conveyance device may be modular such that it is can be integrated into a material handling system to operate with other material conveyance devices from other MSR systems 1200.

The modular storage and retrieval system 1200 may also include a power supply 1214 and a local computing device 1216. The power supply 1214 may be configured to power the local or locally accessible computing device 1216, the robotic manipulator 304, and the stackable storage modules 100. Thus, the power supply 1214 may include a set of batteries, an onboard generator, and/or any other suitable means for generating and/or retaining power to enable off-grid operation of the modular storage and retrieval system 1200. In some examples, the power supply 1214 may include a plug for connecting the shipping container 1206 to the tractor truck to provide power or to connect the shipping container 1206 to a separate power supply (e.g., at a warehouse or other fixed location).

The local computing device 1216 may be configured to control the operation of the devices within the shipping container 1206. For example, based on a request for an item stored in the modular storage and retrieval system 1200, the local computing device 1216 can determine a storage location within a storage container 118 of one of the stackable storage modules 100. The local computing device 1216 can instruct the relevant stackable storage module 100 to cause movement of the storage containers 118 until the relevant storage container 118 is disposed at the rear portion 1212. At this point, the local computing device 1216 can instruct the robotic manipulator 304 to access the relevant storage container 118 to retrieve the item. A similar process can be performed for retrieving multiple items from one container, retrieving items from different storage containers 118 in series, and for storing items in the storage containers 118. The local computing device 1216 can be any suitable networked computer device that is located on or near the container, or that is remotely located and in communication with local input/output components, e.g., a mobile device or container mounted terminal. The computing device includes a memory for storing computer-executable instructions and one or more processors for accessing the memory to execute the computer-executable instructions.

The elements of the MSR system 1200 including the cluster 1202, the robotic manipulator 304, the power supply 1214, and/or the local computing device 1216 may be mounted to a skid or other structure that enables these elements to together be placed into or removed from the shipping container 1206.

The MSR system 1200 may also include a heating, ventilation, and cooling system such as a heater, a refrigeration unit, and the like to maintain temperature and humidity conditions within the shipping container 1206.

In some example, the cluster 1202 may be placed in a freezer to house frozen items. The one end of the cluster 1202 may be disposed adjacent a door or opening of the freezer. To retrieve an item, the storage containers 118 of the relevant stackable storage module 100 can be moved along the track until the appropriate storage container 118 is disposed at the end near the opening. This may avoid having to enter the freezer.

Figure 13:
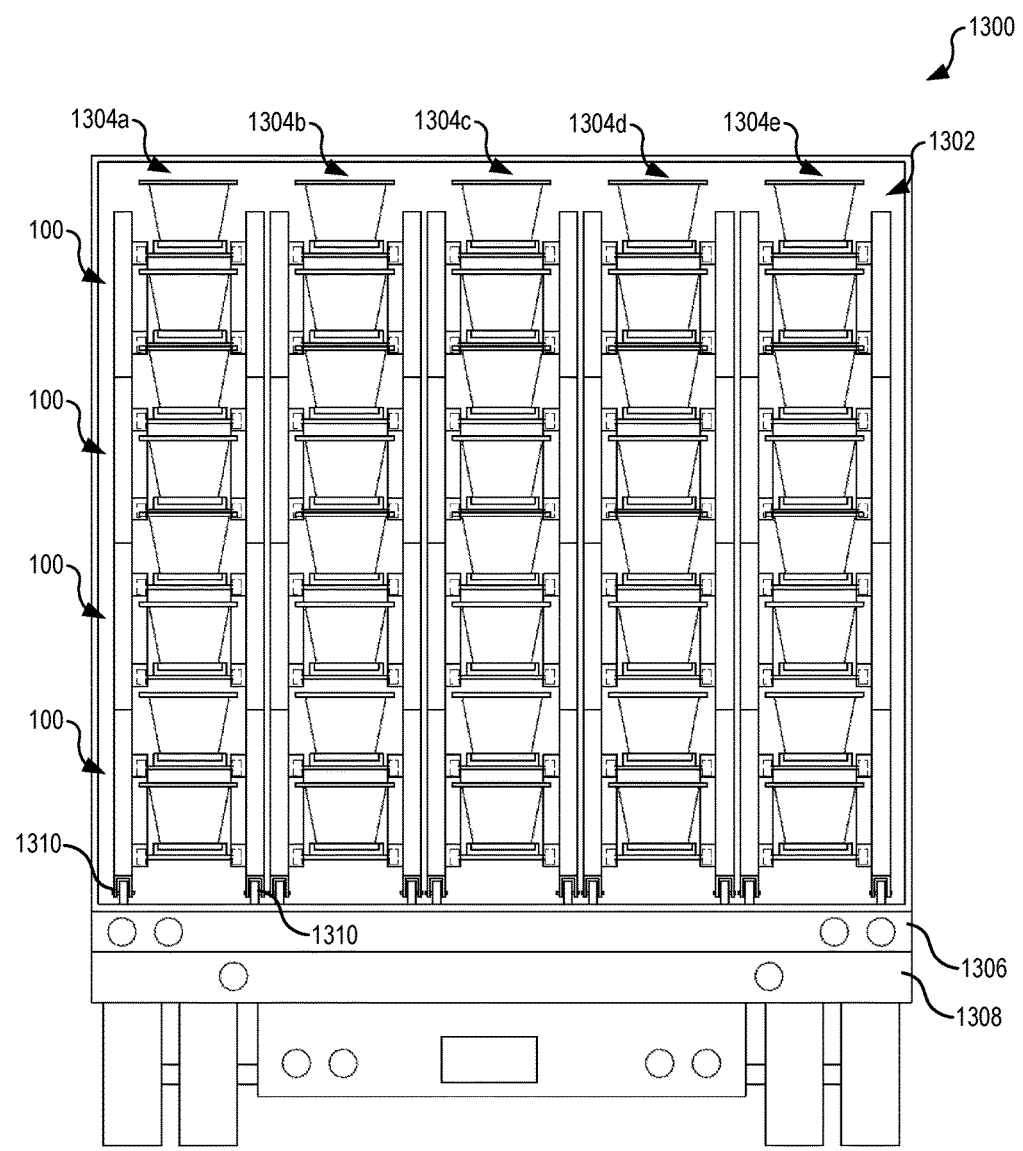
FIG. 13 illustrates a back view of an example modular storage and retrieval system including stackable storage modules, according to at least one example.

FIG. 13 illustrates a back view of an example MSR system 1300 including stackable storage modules 100, according to at least one example. The MSR system 1300 is an example of the MSR system 1200. In particular, the MSR system 1300 includes a cluster 1302 of stackable storage modules 100. The stackable storage modules 100 are formed into a plurality of vertical stacks 1304a-1304e disposed side-by-side. The cluster 1302 is located within a shipping container 1306 that is coupled to a semi-trailer 1308. The view illustrated in FIG. 13 depicts that each vertical stack 1304 may include a set of wheels 1310. The set of wheels 1310 may enable each vertical stack 1304 to be rolled out of the shipping container 1306 independently. For example, when the stackable storage modules 100 have been emptied (e.g., items have been removed from the storage containers 118), the vertical stacks 1304 can be rolled out and replaced with other vertical stacks that are full (e.g., include items in the storage containers 118). In some examples, instead of exchanging the vertical stacks 1304, the entire shipping container 1306 is exchanged when the stackable storage modules 100 have been emptied. In some examples, the vertical stacks 1304 are supported by one or more skids or other structures that can be placed into the shipping container 1306 and removed.

Figure 14:
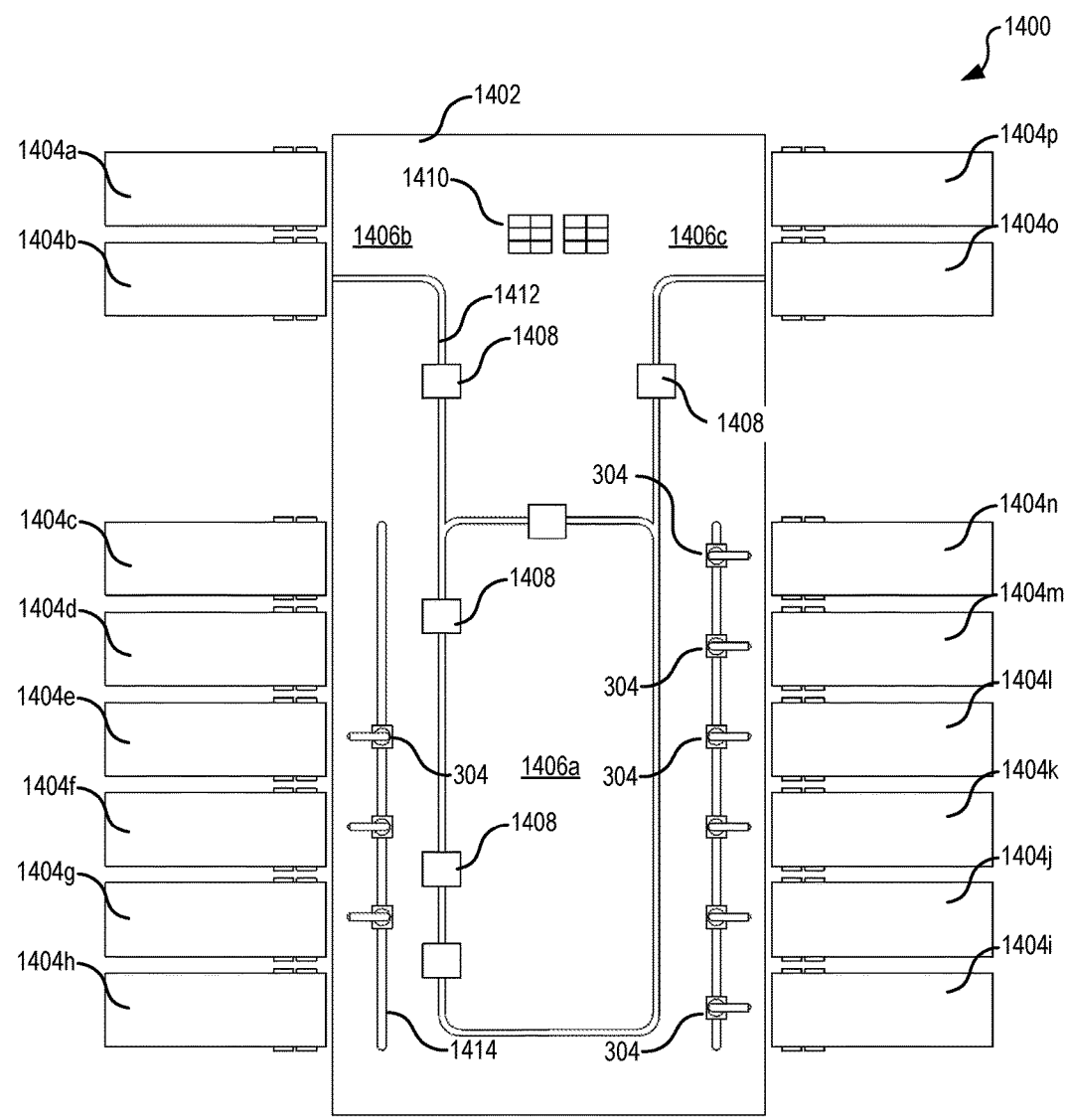
FIG. 14 illustrates a top view of an example item transfer system at which techniques relating to managing item storage and retrieval may be implemented, according to at least one example.
Figure 15:
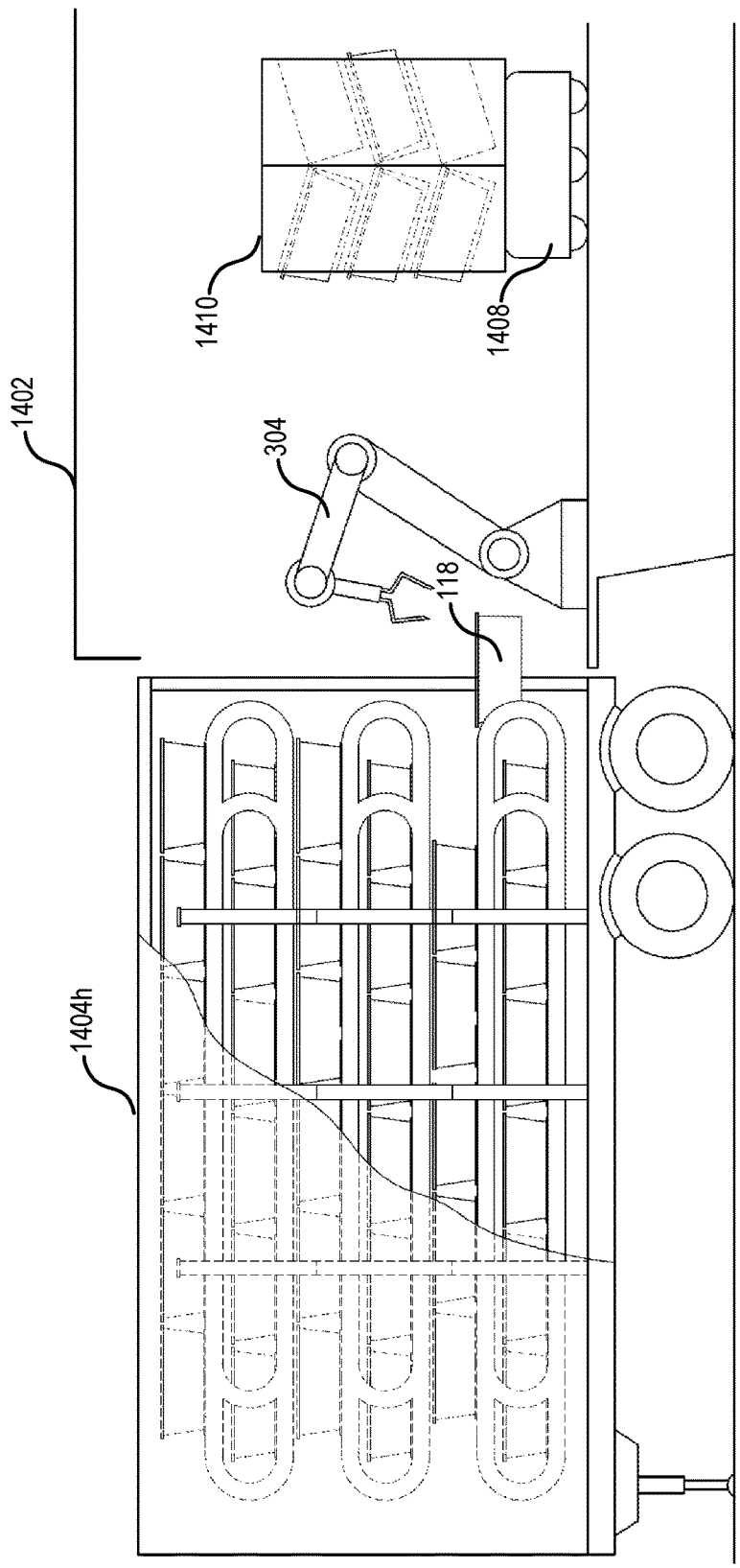
FIG. 15 illustrates a side view of a portion of an item transfer facility of FIG. 14, according to at least one example.

FIG. 14 illustrates an example item transfer system 1400 at which techniques relating to managing item storage and retrieval using stackable storage modules may be implemented, according to at least one example. FIG. 15 illustrates a side view a portion of the item transfer system 1400. The item transfer system 1400 may include an item transfer facility 1402. In some examples, the item transfer system 1400 may be a cross-docking system for transferring items between and among a plurality of shipping containers 1404. The item transfer facility 1402 may include a fixed structure such as a building. The item transfer facility 1402 may include an interior and a plurality of openings to receive the plurality of shipping containers 1404 including MSR systems such as the MSR systems 1300 and 1400. The plurality of shipping containers 1404 may be moved to and from the item transfer facility 1402 by semi-trucks or other equipment. For example, the plurality of shipping containers 1404 may be stored in a multi-story structure designed for holding shipping containers 1404. The multi-story structure may function as a vending machine to dispense different shipping containers 1404 when required at the item transfer facility 1402. Different ones of the shipping containers 1404 currently located at the item transfer facility 1402 may be designated for different purposes. For example, the shipping containers 1404c-1404n may be designated as holding items for retrieval (e.g., within the storage containers 118). The shipping containers 1404a, 1404b may be designated as having empty storage containers 118. The shipping containers 1404o, 1404p may be designated as having full storage containers 118 for further processing. For example, items or storage containers 118 including items may be retrieved from the shipping containers 1404c-1404n and moved to the shipping containers 1404o, 1404p.

To this end, the item transfer system 1400 may include a plurality of robotic manipulators 304, a few of which are labeled. The robotic manipulators 304 are disposed within area 1406a of the item transfer facility 1402. In some examples, the robotic manipulators 304 are also disposed within areas 1406b, 1406c of the item transfer facility 1402. In some examples, each shipping container 1404 is associated with one or more robotic manipulators 304. For example, each of the shipping containers 1404n-1404i may include a robotic manipulator 304 to service the shipping containers 1404n-1404i. In some examples, multiple shipping containers 1404 may be associated with one robotic manipulator 304. For example, the robotic manipulators 304 may be mounted on a track 1414 or in some other way may be enabled for movement between the shipping containers 1404. In this manner, one robotic manipulator 304 may manipulate items and/or storage containers between a first shipping container (e.g., 1404h) and a second shipping container (e.g., 1404c).

The item transfer system 1400 may also include a plurality of mobile drive units 1408, a few of which are labeled. The mobile drive units 1408 are coupled to container holding structures 1410, e.g., see FIG. 15, to retain items and/or storage containers 118. The mobile drive units 1408 are robotic devices including drive wheels that autonomously or semi-autonomously navigate within the item transfer facility 1402. For example, the mobile drive units 1408 may be configured to navigate along route 1412. The route 1412 may be any suitable route to enable the mobile drive units 1408 to access each of the shipping containers 1404. For example, the route 1412 may include fiducials or other markings that the mobile drive units 1408 can use for navigating within the item transfer facility 1402. The route 1412 may also include areas where the mobile drive units 1408 may queue up.

As illustrated in FIG. 15, the robotic manipulator 304 may be configured to access the shipping container 1404 (e.g., the shipping container 1404h) to manipulate items and/or storage containers 118 from the cluster of stackable storage modules disposed within the shipping container 1404. For example, the storage container 118 is illustrated in an access position and the robotic manipulator 304 is preparing to perform a manipulation with respect to the storage container 118. The robotic manipulator 304 may also be configured to manipulate items or storage containers 118 held by the container holding structure 1410 or other suitable structure configured to hold items and/or storage containers 118. For example, the robotic manipulator may remove the storage container 118 from the shipping container 1404h and place it into a compartment of the container holding structure 1410. The mobile drive unit 1408 may then transport the container holding structure 1410 to a different location within the item transfer facility 1402 (e.g., to a different shipping container 1404).

Figure 16:
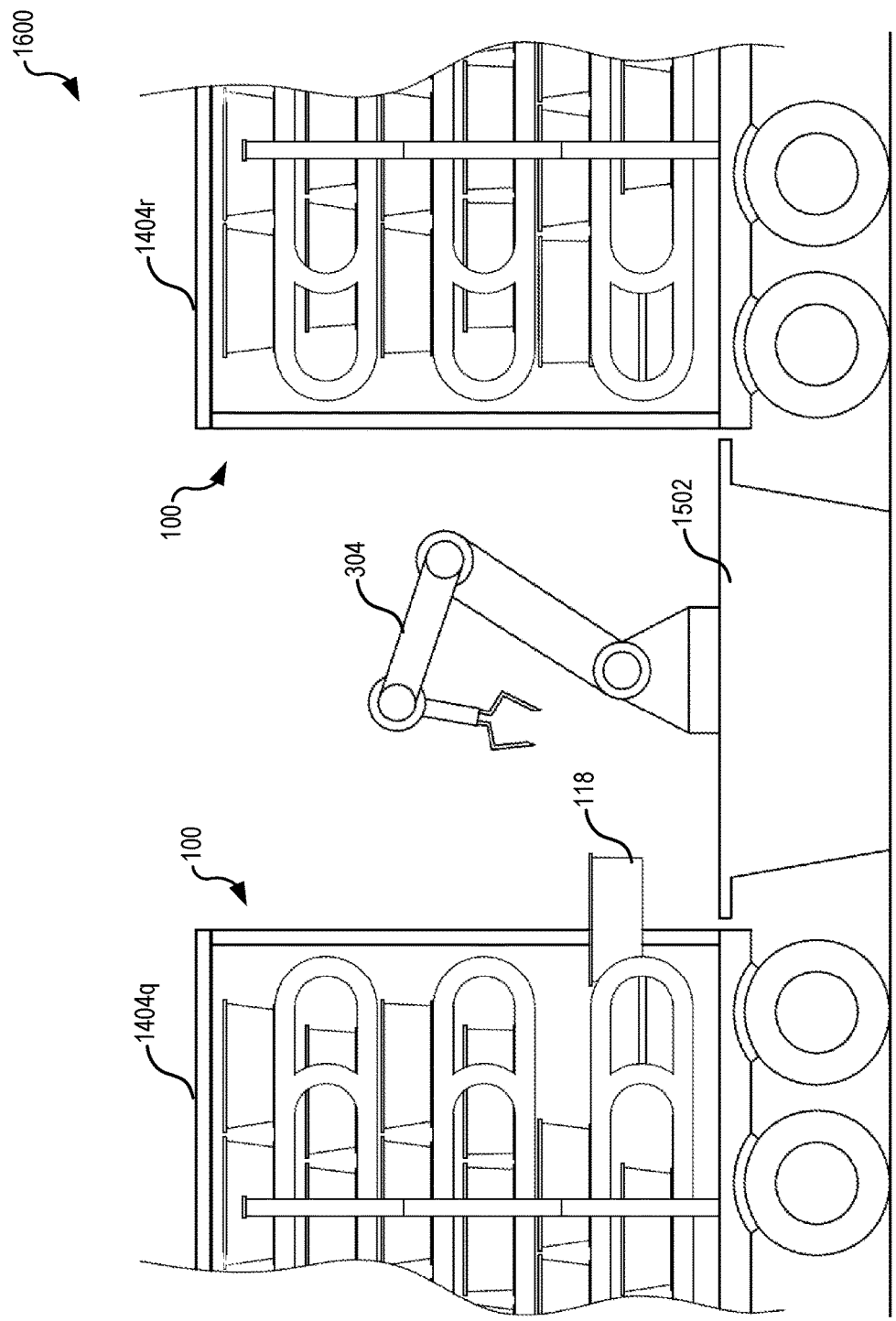
FIG. 16 illustrates a side view of an example cross-docking system, according to at least one example.

FIG. 16 illustrates a side view of an example cross-docking system 1600, according to at least one example. The cross-docking system 1600 may include shipping containers 1404 and a robotic manipulator 304 disposed between the shipping containers 1404. For example, the robotic manipulator 304 may be mounted on a platform 1502. The shipping containers 1404 may be brought in to proximity with the platform 1502 such that the robotic manipulator 304 can access storage containers 118 and/or items held in the shipping containers 1404. In this manner, the robotic manipulator 304 can manipulate storage containers 118 and/or items in each of the shipping containers 1404q, 1404r. In some examples, the cross-docking system 1600 may be implemented without the robotic manipulator 304. For example, a human operator may manipulate items and/or storage containers 118 between the shipping containers 1404.

In some examples, the cross-docking system 1600 may be configured to swap items, storage containers 118, and/or stackable storage modules 100 between shipping containers 1404 and/or other locations. For example, as the shipping container 1404q arrives at the cross-docking system 1600, storage containers 118 of the shipping container 1404q may be removed, inspected, and moved to the shipping container 1404r. Once the shipping container 1404r has been filled with the appropriate storage containers 118, the shipping container 1404r may be removed and transported to a different cross-docking system or facility for additional item transfer or may be used to deliver its contents to customers. A similar process can be performed with respect to items stored in the shipping containers 1404. In some examples, the storage containers 118 (or items) may be removed from one of the shipping containers 1404 and tagged for deployment using some other means. For example, these units (e.g., the storage containers 118 and/or items) may be shipped out by car, unmanned aerial vehicle, truck, bicycle, and any other suitable means of transportation directly from the location of the cross-docking system.

Figure 17:
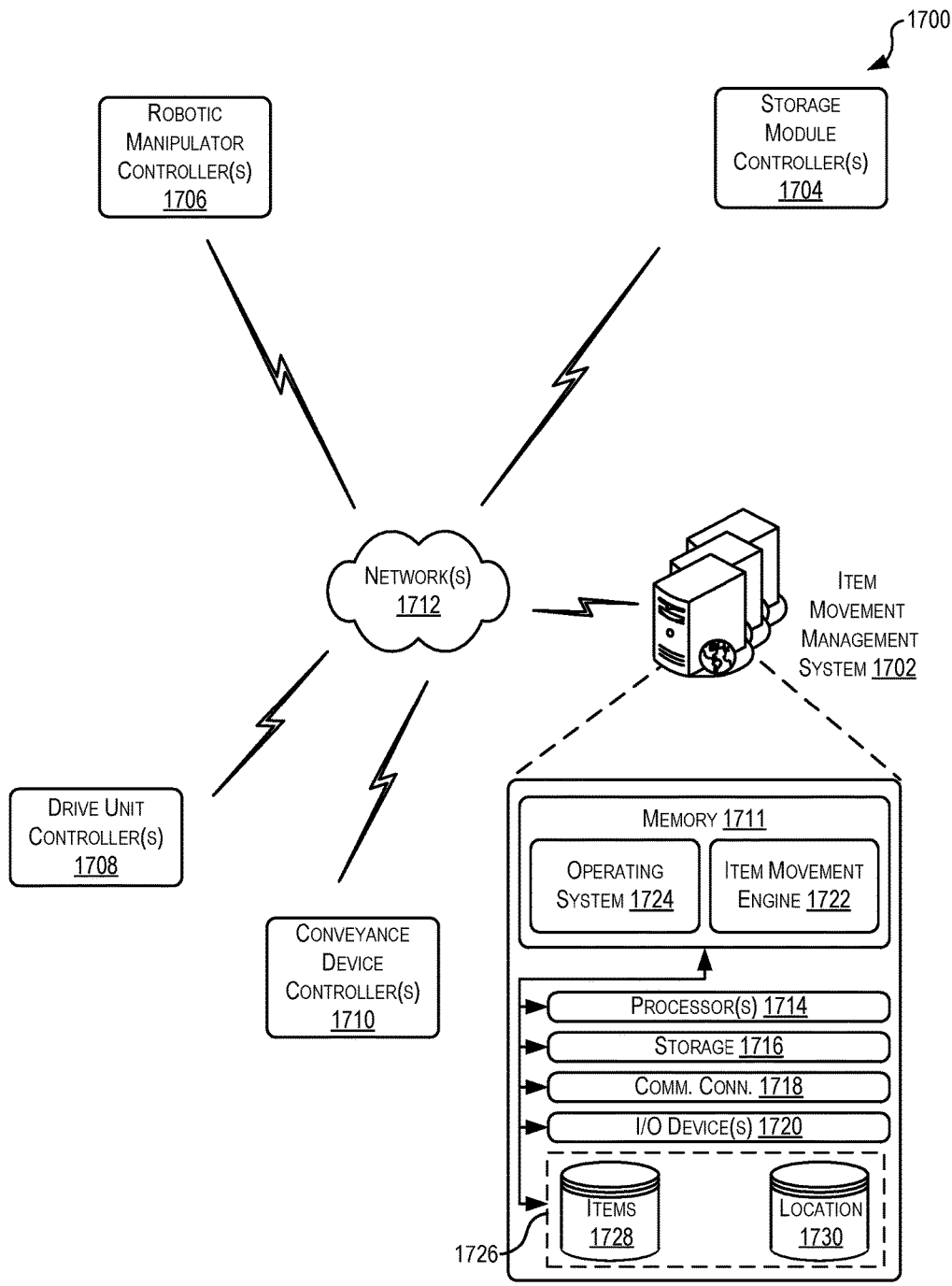
FIG. 17 illustrates an example schematic architecture or system relating to managing item storage and retrieval using stackable storage modules, according to at least one example.

FIG. 17 illustrates an example schematic architecture or system 1700 relating to managing item storage and retrieval using stackable storage modules 100, according to at least one example. The architecture 1700 includes an item movement management system 1702, storage module controller(s) 1704, robotic manipulator controller(s) 1706, drive unit controller(s) 1708, and conveyance device controller(s) 1710 in communication with each other via one or more networks 1712. The network 1712 may include any one or a combination of many different types of networks, such as cable networks, the Internet, wireless networks, cellular networks, satellite networks, other private and/or public networks, or any combination thereof. In some examples, certain ones of the elements of the architecture 1700 communicate via a first network, while other elements communicate via a second network. The networks 1712 may also include wireless personal area networks such as Bluetooth, Wi-Fi, and other similar wireless networks. In some examples, the elements of the architecture 1700 are electrically coupled to each other instead of, or in addition to, the network 1712.

The storage module controller(s) 1704, the robotic manipulator controller(s) 1706, the drive unit controller(s) 1708, and the conveyance device controller(s) 1710 may include any suitable combination of software and/or hardware to control their respective devices. For example, the storage module controller 1704 may include any suitable control circuitry capable of independent control of the movement systems 106 (e.g., drive motors). The robotic manipulator controller 1706 may include any suitable control circuitry capable of receiving, processing, executing, and generating instructions relating to movement of the degrees of freedom of the robotic manipulator 304. The drive unit controller 1708 may include any suitable control circuitry capable of receiving, processing, executing, and generating instructions relating to movement of the mobile drive units 1408 (e.g., coupling with the structures 1410, transporting the structures 1410, etc.). The conveyance device controllers 1710 may include any suitable control circuitry such as speed sensors, variable speed drive, power switch, etc. in communication with drive motors of material handling equipment described herein.

The item movement management system 1702 may be configured to manage aspects of managing item storage and retrieval using stackable storage modules 100. To this end, the item movement management system 1702 may include any suitable combination of one or more computing devices such as, but not limited to, a server, a virtual machine instance, a set of servers or set of virtual machines, a mobile phone, a smartphone, a PDA, a laptop computer, a desktop computer, a thin-client device, a tablet computer, etc. The item movement management system 1702 may function to manage the operation of the other elements in the architecture 1700.

Turning now to the item movement management system 1702 in detail, in some examples, the item movement management system 1702 may include at least one memory 1711 and one or more processing units (or processor(s)) 1714. The processor(s) 1714 may be implemented as appropriate in hardware, computer-executable instructions, firmware, or combinations thereof. Computer-executable instruction or firmware implementations of the processor(s) 1714 may include computer-executable or machine-executable instructions written in any suitable programming language to perform the various functions described.

The memory 1711 may store program instructions that are loadable and executable on the processor(s) 1714, as well as data generated during the execution of these programs. Depending on the configuration and type of the item movement management system 1702, the memory 1711 may be volatile (such as RAM) and/or non-volatile (such as ROM, flash memory, etc.). The item movement management system 1702 may also include additional removable storage and/or non-removable storage 1716 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 1711 may include multiple different types of memory, such as SRAM, DRAM, or ROM. While the volatile memory described herein may be referred to as RAM, any volatile memory that would not maintain data stored therein once unplugged from a host and/or power would be appropriate. The memory 1711 and the additional storage 1716, both removable and non-removable, are both additional examples of non-transitory computer-readable storage media.

The item movement management system 1702 may also include communications connection(s) 1718 that allow the item movement management system 1702 to communicate with a data store, another computing device or server, user terminals and/or other devices (e.g., the robotic manipulator controllers 1706, the storage module controllers 1704, the drive unit controllers 1708, the conveyance device controllers 1710) via the networks 1712. In this manner, the communications connections 1718 can include network interfaces to enable connection to network devices. The item movement management system 1702 may also include I/O device(s) 1720, such as a keyboard, a mouse, a pen, a voice input device, a touch input device, a display, speakers, a printer, etc.

Turning to the contents of the memory 1711 in more detail, the memory 1711 may include an operating system 1724 and/or one or more application programs or services for implementing the features disclosed herein including an item movement engine 1722. In some examples, the item movement engine 1722 may be configured to manage item storage and retrieval using stackable storage modules 100.

The item movement management system 1702 may also include a data store 1726. In some examples, the data store 1726 may include one or more data stores, databases, data structures, or the like for storing and/or retaining information associated with the item movement management system 1702. For example, the data store 1726 may include databases, such as an item database 1728 and a location database 1730.

The item database 1728 may be used to store information about the items stored and retrieved from the stackable storage modules 100 as described herein. For example, the item database 1728 may include characteristics or properties of the items. The item database 1728 may be organized according to unique item identifiers such as serial numbers assigned by a materials handling facility, serial numbers assigned by a manufacturer, RFID tag numbers, and any other unique identifier. The characteristics or properties included in the item database may include, for example, weight, dimensions, volume, item type, special considerations (e.g., fragile, toxic, flammable, etc.), whether reserved for an order, expected time for storage, stock item images, other item images (e.g., captured at different points in time while the item is being stored), and any other suitable information.

The location database 1730 may be used to store location information about the items as they move throughout a material handling facility. For example, using sensor data, the item movement management system 1702 may track the location of the items and store those locations in the location database. The location information may identify item positions at a storage container level or at some other level of granularity. For example, for a particular item, the location information may identify multiple levels of how the location may be represented e.g., storage container identifier, stackable storage module identifier, vertical stack identifier, cluster identifier, shipping container identifier, cluster of shipping containers identifiers, and any other suitable identifier.

Figure 18:
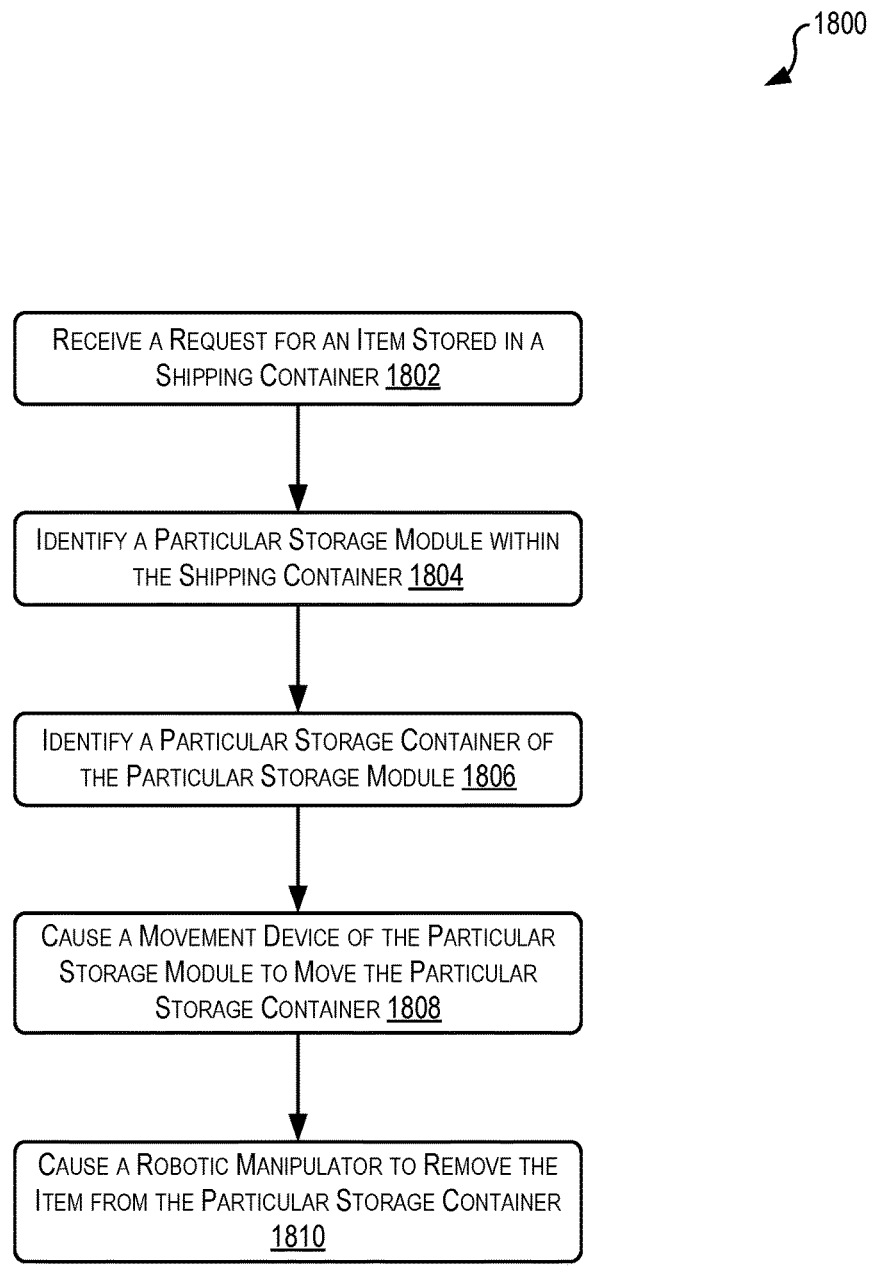
FIG. 18 illustrates a flow diagram depicting example acts for implementing techniques relating to managing item storage and retrieval using stackable storage modules, according to at least one example.
Figure 19:
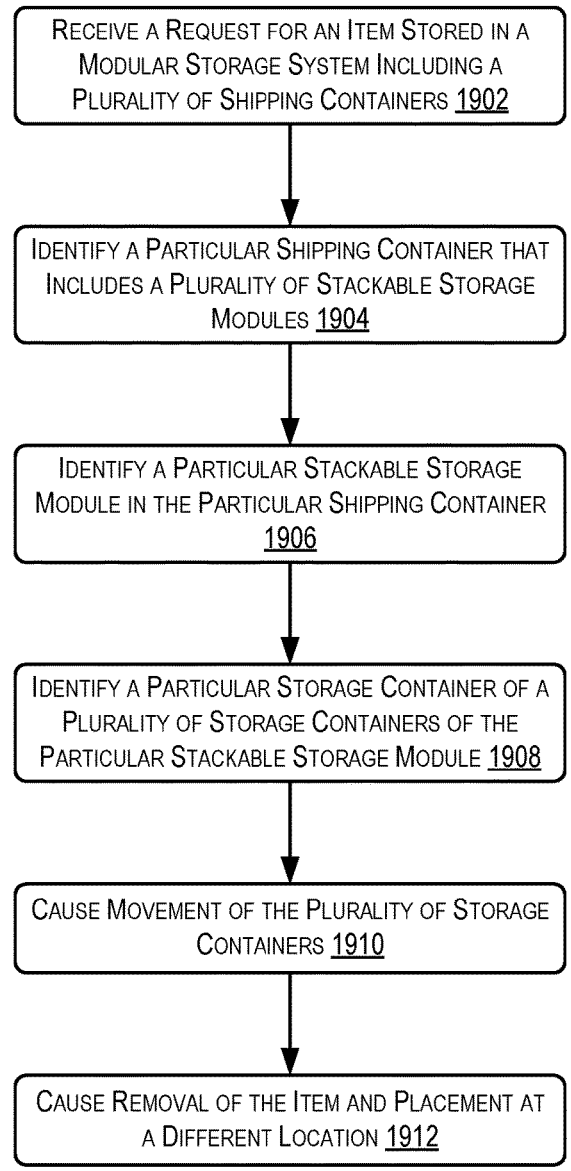
FIG. 19 illustrates a flow diagram depicting example acts for implementing techniques relating to managing item storage and retrieval using stackable storage modules, according to at least one example.
Figure 20:
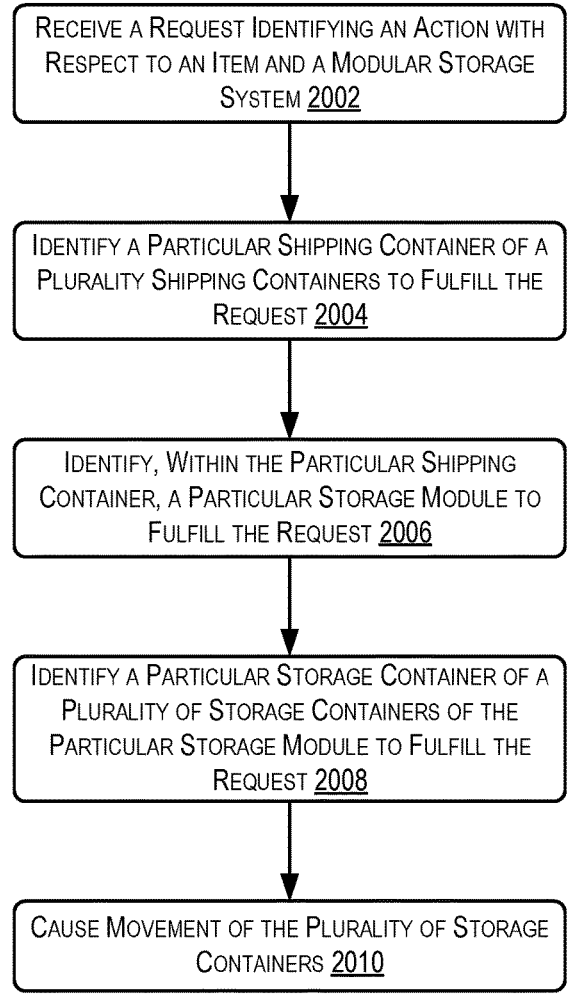
FIG. 20 illustrates a flow diagram depicting example acts for implementing techniques relating to managing item storage and retrieval using stackable storage modules, according to at least one example.

FIGS. 18, 19, and 20 illustrate example flow diagrams showing respective processes 1800, 1900, and 2000 as described herein. These processes 1800, 1900, and 2000 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 18 illustrates a flow diagram depicting the process 1800 for implementing techniques relating to managing item storage and retrieval using stackable storage modules, according to at least one example. The item movement engine 1722 embodied in the item movement management system 1702 may perform the process 1800 of FIG. 18.

The process 1800 begins at 1802 by receiving a request for an item stored in a shipping container. The shipping container may include a plurality of storage modules arranged into a plurality of vertical stacks disposed next to one another. In some examples, each storage module may include a plurality of storage containers and may be mechanized for moving the plurality of storage containers among the respective storage modules.

At 1804, the process 1800 identifies a particular storage module within the shipping container. This may include identifying, based at least in part on the request, the particular storage module from among the plurality of storage modules.

At 1806, the process 1800 identifies a particular storage container of the particular storage module in which the item is stored. This may be based at least in part on the request.

At 1808, the process 1800 causes a movement device of the particular storage module to move the particular storage container. This may include moving the particular storage container from an initial position to an access position. In some examples, causing the movement device to move the particular storage container includes cycling other storage containers through the access position until the particular storage container is located at the access position. In some examples, the access position of each storage module may be disposed adjacent to an opening of the shipping container.

At 1810, the process 1800 causes a robotic manipulator to remove the item from the particular storage container. This may include removing the item from the particular storage container when the particular storage container is in the access position. The robotic manipulator may be disposed with the shipping container or outside of the shipping container.

The process 1800 may further include determining the initial position based at least in part on position data corresponding to the movement device and/or scan data corresponding to the plurality of storage containers.

FIG. 19 illustrates a flow diagram depicting the process 1900 for implementing techniques relating to managing item storage and retrieval using stackable storage modules, according to at least one example. The item movement engine 1722 embodied in the item movement management system 1702 may perform the process 1900 of FIG. 19.

The process 1900 begins at 1902 by receiving a request for an item stored in a modular storage system. The modular storage system may include a plurality of shipping containers. The plurality of shipping containers may be accessible from an item transfer facility. In some examples, each shipping container may include a plurality of stackable storage modules arranged into a plurality of vertical stacks disposed next to one another within an interior of the respective shipping container. In some examples, each stackable storage module may include a plurality of storage containers, a frame configured to (i) support the plurality of storage containers and (ii) engage with a first other stackable storage module disposed below the stackable storage module and a second other stackable storage module disposed above the stackable storage module, and a movement device configured to move the plurality of storage containers with respect to the frame and independent of movements of other storage containers of other stackable storage modules.

At 1904, the process 1900 identifies a particular shipping container that includes a plurality of stackable storage modules. The particular shipping container may be one of the plurality of shipping containers. The item may be stored in the particular shipping container.

At 1906, the process 1900 identifies a particular stackable storage module in the particular shipping container. The item may be stored in the particular stackable storage module.

At 1908, the process 1900 identifies a particular storage container of a plurality of storage containers of the particular stackable storage module. The item may be stored in the particular storage container of the plurality of storage containers.

At 1910, the process 1900 causes movement of the plurality of storage containers. Causing movement may be performed by a particular movement device. The movement may cause the particular storage container to be moved to an access position.

At 1912, the process 1900 causes removal of the item and placement of the item at a different location. Removal of the item and placement of the item may be performed by a robotic manipulator. In some examples, the different location is a holder structure coupled to a mobile drive unit. The process 1900 may further include, after the item has been placed at the different location, causing the mobile drive unit to transport the item in the holder structure within the item transfer facility. In some examples, causing removal of the item and placement of the item comprises causing removal of the particular storage container by the robotic manipulator and placement of the particular storage container by the robotic manipulator at the different location.

In some examples, the item transfer facility includes an interior area housing the robotic manipulator and a plurality of walls surrounding the interior area. At least one wall may include a plurality of openings configured to receive at least a portion of the plurality of shipping containers.

FIG. 20 illustrates a flow diagram depicting the process 2000 for implementing techniques relating to managing item storage and retrieval using stackable storage modules, according to at least one example. The item movement engine 1722 embodied in the item movement management system 1702 may perform the process 2000 of FIG. 20.

The process 2000 begins at 2002 by receiving a request identifying an action with respect to an item and a modular storage system. The modular storage system may include a plurality of shipping containers accessible from an item transfer facility. In some examples, each shipping container may include a plurality of storage modules arranged into a plurality of vertical stacks disposed next to one another within an interior of the shipping container. In some examples, each storage module may include a plurality of storage containers which may be mechanized to move the plurality of storage containers.

In some examples, each storage module may include a frame configured to (i) support the plurality of storage containers and (ii) engage with a first other storage module disposed below the storage module and a second other storage module disposed above the storage module.

In some examples, each storage module may also include a movement device configured to move the plurality of storage containers with respect to the frame and independent of movement of other storage containers of other storage modules.

In some examples, the action may include a storage action resulting in the item being placed in the particular storage container, a retrieval action resulting in the item being removed from the particular storage container, or an inspection action resulting in the item being inspected at the particular storage container.

In some examples, each storage module may be mechanized to move its respective plurality of storage containers independent of other pluralities of storage containers of other storage modules.

In some examples, the request is associated with a customer order identifying the item.

At 2004, the process 2000 identifies a particular shipping container of the plurality of shipping containers to fulfill the request.

At 2006, the process 2000 identifies, within the particular shipping container, a particular storage module to fulfill the request.

At 2008, the process 2000 identifies a particular storage container of a plurality of storage containers of the particular storage module to fulfill the request.

At 2010, the process 2000 causes movement of the plurality of storage containers. This may include causing movement of the plurality of storage containers to move the particular storage container to an access position. In some examples, causing movement of the plurality of storage containers includes causing movement of the plurality of storage containers by a particular movement device of the particular storage module.

The process 2000 may further include, after the particular storage container has been moved to the access position, causing removal of the item from the particular storage container and placement of the item at a different location. In some examples, causing removal of the item from the particular storage container and placement of the item at the different location may include removal of the item from the particular storage container by a robotic manipulator and placement of the item at the different location by the robotic manipulator.

In some examples, the different location is a holder structure coupled to a mobile drive unit. The process 2000 may further include, after the item has been placed at the different location, causing the mobile drive unit to transport the item in the holder structure within the item transfer facility.

In some examples, the different location is a horizontal conveyor surface. The process 2000 may further include, after the item has been placed at the different location, causing the horizontal conveyor surface to convey the item within the item transfer facility.

In some examples, the process 2000 may further include, after the particular storage container has been moved to the access position, causing placement of the item at the particular storage container.

Figure 21:
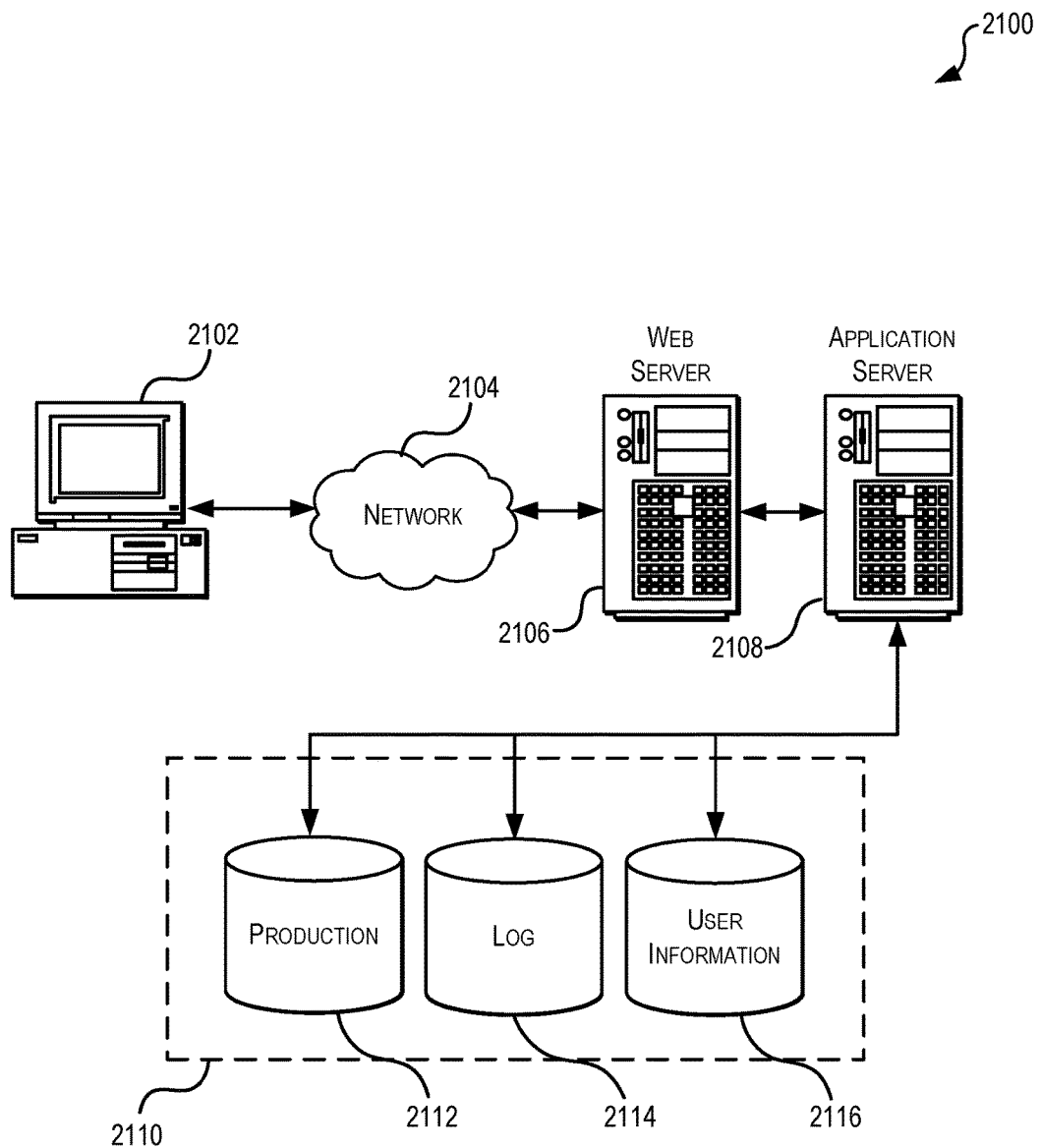
FIG. 21 illustrates an environment in which various examples can be implemented, according to at least one example.

FIG. 21 illustrates aspects of an example environment 2100 for implementing aspects in accordance with various examples. As will be appreciated, although a Web-based environment is used for purposes of explanation, different environments may be used, as appropriate, to implement various examples. The environment includes an electronic client device 2102, which can include any appropriate device operable to send and receive requests, messages, or information over an appropriate network 2104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2106 for receiving requests and serving content in response thereto, although for other networks an alternative device serving a similar purpose could be used as would be apparent to one of ordinary skill in the art.

The illustrative environment includes at least one application server 2108 and a data store 2110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 2102 and the application server 2108, can be handled by the Web server. It should be understood that the Web and application servers are not required and are merely example components, as structured code discussed herein can be executed on any appropriate device or host machine as discussed elsewhere herein.

The data store 2110 can include several separate data tables, databases or other data storage mechanisms and media for storing data relating to a particular aspect. For example, the data store illustrated includes mechanisms for storing production data 2112 and user information 2116, which can be used to serve content for the production side. The data store also is shown to include a mechanism for storing log data 2114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 2110. The data store 2110 is operable, through logic associated therewith, to receive instructions from the application server 2108 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 2102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 21. Thus, the depiction of the system 2100 in FIG. 21 should be taken as being illustrative in nature and not limiting to the scope of the disclosure.

The various examples further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk ("DVD"), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving a request for an item stored in a modular storage system, the modular storage system comprising a plurality of shipping containers accessible from an item transfer facility, each shipping container comprising a plurality of stackable storage modules arranged into a plurality of vertical stacks disposed next to one another within an interior of the respective shipping container, each stackable storage module comprising:
        a plurality of storage containers;
        a frame configured to (i) support the plurality of storage containers and (ii) engage with a first other stackable storage module disposed below the stackable storage module and a second other stackable storage module disposed above the stackable storage module; and
        a movement device configured to move the plurality of storage containers with respect to the frame and independent of movement of other storage containers of other stackable storage modules;
    identifying a particular shipping container of the plurality of shipping containers in which the item is stored;
    identifying a particular stackable storage module in the particular shipping container in which the item is stored, the particular stackable storage module comprising a particular plurality of storage containers and being disposed in a particular vertical stack of the stackable storage modules;
    identifying a particular storage container of the particular plurality of storage containers in which the item is stored;
    causing movement of the particular plurality of storage containers of the particular storage module by a particular movement device, independent of other storage modules of the particular vertical stack moving their respective storage containers, to move the particular storage container around the particular storage module to an access position; and
    causing removal of the item by a material handling device and placement of the item by the material handling device at a different location.

2. The computer-implemented method of claim 1, wherein:
    the different location is a holder structure coupled to a mobile drive unit; and
    the method further comprises, after the item has been placed at the different location, causing the mobile drive unit to transport the item in the holder structure within the item transfer facility.

3. The computer-implemented method of claim 1, wherein causing removal of the item and placement of the item comprises causing removal of the particular storage container by the material handling device and placement of the particular storage container by the material handling device at the different location.

4. The computer-implemented method of claim 1, wherein the item transfer facility is a building that comprises:
an interior area housing the material handling device; and
a plurality of walls surrounding the interior area, at least one wall comprising at least one opening configured to receive at least a portion of the plurality of shipping containers.

5. The computer-implemented method of claim 1, wherein each vertical stack comprises a plurality of the stackable storage modules, and each stackable storage module is configured to move its plurality of storage containers along a movement path that forms a closed shape in a vertical plane and that is separate from movement paths of others of the plurality of stackable storage modules.

6. A computer-implemented method, comprising:
receiving a request identifying an action with respect to an item and a modular storage system, the modular storage system comprising a plurality of shipping containers accessible from an item transfer facility, each shipping container comprising a plurality of storage modules arranged into a plurality of vertical stacks disposed next to one another within an interior of the shipping container, each storage module comprising a plurality of storage containers and being mechanized to move its respective plurality of storage containers independent of other pluralities of storage containers of other storage modules;
identifying a particular shipping container of the plurality of shipping containers to fulfill the request;
identifying, within the particular shipping container, a particular storage module in a particular vertical stack of the storage modules to fulfill the request, the particular storage module comprising a particular plurality of storage containers;
identifying, from among the particular plurality of storage containers, a particular storage container to fulfill the request; and
causing the particular plurality of storage containers of the particular storage module to move around the particular storage module to an access position, independent of other storage modules of the particular vertical stack moving their respective storage containers.

7. The computer-implemented method of claim 6, further comprising, after the particular storage container has been moved to the access position, instructing placement of the item at the particular storage container.

8. The computer-implemented method of claim 6, wherein the action comprises:
a storage action resulting in the item being placed in the particular storage container;
a retrieval action resulting in the item being removed from the particular storage container; or
an inspection action resulting in the item being inspected at the particular storage container.

9. The computer-implemented method of claim 6, wherein the request is associated with a customer order identifying the item.

10. The computer-implemented method of claim 6, wherein each vertical stack comprises a plurality of the storage modules, and each storage module is configured to move its plurality of storage containers along a movement path that forms a closed shape in a vertical plane and that is separate from movement paths of others of the plurality of storage modules.

11. The computer-implemented method of claim 6, wherein each storage module further comprises:
a frame configured to (i) support the plurality of storage containers and (ii) engage with a first other storage module disposed below the storage module and a second other storage module disposed above the storage module; and
a movement device configured to move the plurality of storage containers with respect to the frame and independent of movement of other storage containers of other storage modules.

12. The computer-implemented method of claim 11, wherein causing movement of the particular plurality of storage containers comprises causing movement of the particular plurality of storage containers by a particular movement device of the particular storage module.

13. The computer-implemented method of claim 6, further comprising, after the particular storage container has been moved to the access position, instructing removal of the item from the particular storage container and placement of the item at a different location.

14. The computer-implemented method of claim 13, wherein:
the different location is a holder structure coupled to a mobile drive unit; and
the method further comprises, after the item has been placed at the different location, causing the mobile drive unit to transport the item in the holder structure within the item transfer facility.

15. The computer-implemented method of claim 13, wherein:
the different location is a horizontal conveyor surface; and
the method further comprises, after the item has been placed at the different location, causing the horizontal conveyor surface to convey the item within the item transfer facility.

16. The computer-implemented method of claim 13, wherein instructing removal of the item from the particular storage container and placement of the item at the different location comprises instructing removal of the item from the particular storage container by a robotic manipulator and placement of the item at the different location by the robotic manipulator.

17. A system, comprising:
an item transfer facility comprising a plurality of openings configured to receive a plurality of shipping containers, each shipping container comprising a plurality of storage modules disposed within the respective shipping container, each storage module comprising a plurality of storage containers and each storage module configured to move its plurality of storage containers independent of movement of other storage containers of other storage modules;
a mobile drive unit detachably coupled to a holder structure, the mobile drive unit configured to transport items in the holder structure within the item transfer facility;
a robotic manipulator configured to manipulate at least one of the items or storage containers with respect to the plurality of shipping containers and the holder structure;
a management system in communication with the pluralities of storage modules of the plurality of shipping containers, the mobile drive unit, and the robotic manipulator, and configured to:
- receive a request for an item stored in a first storage container of a first storage module of a first shipping container, the first storage module being disposed in a first vertical stack of the storage modules;
- cause the storage containers of the first storage module to move around the first storage module, independent of other storage modules of the first vertical stack moving their respective storage containers, to present the first storage container at an access position;
- cause removal of the item from the first storage container by the robotic manipulator and placement of the item in the holder structure by the robotic manipulator; and
- cause transportation of the holder structure within the item transfer facility by the mobile drive unit.

18. The system of claim 17, wherein the plurality of storage modules disposed within each shipping container is arranged into a plurality of vertical stacks disposed next to one another.

19. The system of claim 17, wherein each storage module further comprises:
- a frame configured to (i) support the plurality of storage containers and (ii) engage with a first other storage module disposed below the storage module and a second other storage module disposed above the storage module; and
- a movement device configured to move the plurality of storage containers with respect to the frame and independent of movement of other storage containers of other storage modules.

20. The system of claim 17, wherein each storage module is configured to move its plurality of storage containers along a movement path that forms a closed shape in a vertical plane and that is separate from movement paths of others of the plurality of storage modules.

21. The system of claim 17, wherein causing transportation of the holder structure by the mobile drive unit comprises instructing the mobile drive unit to move the holder structure to a particular location within the item transfer facility.

22. The system of claim 21, wherein:
- the system further comprises a second robotic manipulator disposed adjacent to the particular location; and
- the management system is in communication with the second robotic manipulator, and further configured to cause the second robotic manipulator to remove the item from the holder structure when the holder structure is located at the particular location.

* * * * *